(12) United States Patent
Na

(10) Patent No.: US 11,507,322 B2
(45) Date of Patent: Nov. 22, 2022

(54) MEMORY CONTROLLER AND STORAGE DEVICE INCLUDING THE SAME

(71) Applicant: SK hynix Inc., Gyeonggi-do (KR)

(72) Inventor: Chung Un Na, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/365,185

(22) Filed: Jul. 1, 2021

(65) Prior Publication Data

US 2022/0197561 A1 Jun. 23, 2022

(30) Foreign Application Priority Data

Dec. 18, 2020 (KR) .......................... 10-2020-0178166

(51) Int. Cl.
*G06F 3/06* (2006.01)
(52) U.S. Cl.
CPC ............ *G06F 3/0659* (2013.01); *G06F 3/064* (2013.01); *G06F 3/0604* (2013.01); *G06F 3/0652* (2013.01); *G06F 3/0679* (2013.01)
(58) Field of Classification Search
CPC ...... G06F 3/0659; G06F 3/0604; G06F 3/064; G06F 3/0652; G06F 3/0679
See application file for complete search history.

(56) References Cited

U.S. PATENT DOCUMENTS

| | | | | |
|---|---|---|---|---|
| 9,792,995 | B1 * | 10/2017 | Shah | G11C 7/1039 |
| 2011/0072243 | A1 * | 3/2011 | Qiu | G06F 9/3887 |
| | | | | 712/216 |
| 2014/0258596 | A1 * | 9/2014 | Kojima | G06F 12/0246 |
| | | | | 711/103 |
| 2019/0369917 | A1 * | 12/2019 | Jin | G06F 13/1626 |
| 2020/0192735 | A1 * | 6/2020 | Ioannou | G06F 3/064 |
| 2020/0272357 | A1 * | 8/2020 | Strait | G06F 3/0604 |
| 2020/0310643 | A1 * | 10/2020 | Li | G06F 3/061 |
| 2022/0197560 | A1 * | 6/2022 | Na | G06F 12/02 |

FOREIGN PATENT DOCUMENTS

| | | |
|---|---|---|
| KR | 10-2010-0120518 A | 11/2010 |
| KR | 10-2017-0141298 A | 12/2017 |
| KR | 10-2019-0019543 A | 2/2019 |
| KR | 10-2019-0089365 A | 7/2019 |
| KR | 1020220087782 | 6/2022 |

\* cited by examiner

*Primary Examiner* — Francisco A Grullon
(74) *Attorney, Agent, or Firm* — IP & T Group LLP

(57) ABSTRACT

There are provided a memory controller and a storage device including the same. The memory controller includes: a command storage including a first read command queue and a second read command queue; a command generation controller configured to provide an erase command, a suspend command, a resume command, and output a scheduling event signal after the resume command is output; and a command schedule controller configured to: search for a first physical address group, reorder a output sequence of the first read command queue, and provide a command to perform the read command based on the second read command queue.

20 Claims, 21 Drawing Sheets

| Index | Physical Address | | RCMD |
|---|---|---|---|
| 0 | P0 | BLK100 | PG5 | S0 | RCMD1 |
| 1 | P0 | BLK200 | PG10 | S3 | RCMD2 |
| 2 | P3 | BLK303 | PG50 | S2 | RCMD3 |
| 3 | P0 | BLK100 | PG5 | S3 | RCMD4 |
| 4 | P2 | BLK206 | PG10 | S2 | RCMD5 |
| 5 | | | | | |
| 6 | | | | | |
| 7 | | | | | |

220

222

| Index | Physical Address | RCMD |
|---|---|---|
| 0 | | |
| 1 | | |
| 2 | | |
| 3 | | |
| 4 | | |
| 5 | | |
| 6 | | |
| 7 | | |

FIG. 10

Table 221:

| Index | Physical Address | | | RCMD |
|---|---|---|---|---|
| 0 | P0 | BLK100 | PG5 S0 | RCMD1 |
| 1 | P0 | BLK200 | PG10 S3 | RCMD2 |
| 2 | P3 | BLK303 | PG50 S2 | RCMD3 |
| 3 | P0 | BLK100 | PG5 S3 | RCMD4 |
| 4 | P2 | BLK206 | PG10 S2 | RCMD5 |
| 5 | | | | |
| 6 | | | | |
| 7 | | | | |

REORDERING ⇑

Table 222:

| Index | Physical Address | | | RCMD |
|---|---|---|---|---|
| 0 | P0 | BLK100 | PG5 S0/S3 | RCMD1 (SP read) |
| 1 | P3 | BLK303 | PG50 S2 | RCMD2 |
| 2 | P0/P2 | BLK200/BLK206 | PG10 S3/S2 | RCMD3 (MP read) |
| 3 | | | | |
| 4 | | | | |
| 5 | | | | |
| 6 | | | | |
| 7 | | | | |

FIG. 12

| Index | Physical Address | | | RCMD |
|---|---|---|---|---|
| 0 | P0 | BLK100 | PG5 S0 | RCMD1 |
| 1 | P0 | BLK200 | PG10 S3 | RCMD2 |
| 2 | P3 | BLK303 | PG50 S2 | RCMD3 |
| 3 | P0 | BLK100 | PG5 S3 | RCMD4 |
| 4 | P2 | BLK206 | PG10 S2 | RCMD5 |
| 5 | | | | |
| 6 | | | | |
| 7 | | | | |

221

⇧ REORDERING

| Index | Physical Address | | | RCMD |
|---|---|---|---|---|
| 0 | P0 | BLK100 | PG5 S0/S3 | RCMD1 (SP read) |
| 1 | P2 | BLK206 | PG10 S2 | RCMD2 |
| 2 | P3 | BLK303 | PG50 S2 | RCMD3 |
| 3 | P0 | BLK200 | PG10 S3 | RCMD4 |
| 4 | | | | |
| 5 | | | | |
| 6 | | | | |
| 7 | | | | |

| Index | Physical Address | | | RCMD |
|---|---|---|---|---|
| 0 | P0 | BLK100 | PG5 | S0 | RCMD1 |
| 1 | P0 | BLK200 | PG10 | S3 | RCMD2 |
| 2 | P1 | BLK301 | PG50 | S1 | RCMD3 |
| 3 | P1 | BLK405 | PG17 | S2 | RCMD4 |
| 4 | P1 | BLK609 | PG33 | S2 | RCMD5 |
| 5 | P3 | BLK903 | PG75 | S1 | RCMD6 |
| 6 | P2 | BLK706 | PG44 | S3 | RCMD7 |
| 7 | | | | | |

222

| Index | Physical Address | RCMD |
|---|---|---|
| 0 | | |
| 1 | | |
| 2 | | |
| 3 | | |
| 4 | | |
| 5 | | |
| 6 | | |
| 7 | | |

FIG. 16

Table 221:

| Index | Physical Address | | | RCMD |
|---|---|---|---|---|
| 0 | P0 | BLK100 | PG5 | S0 | RCMD1 |
| 1 | P0 | BLK200 | PG10 | S3 | RCMD2 |
| 2 | P1 | BLK301 | PG50 | S1 | RCMD3 |
| 3 | P1 | BLK405 | PG17 | S2 | RCMD4 |
| 4 | P1 | BLK609 | PG33 | S2 | RCMD5 |
| 5 | P3 | BLK903 | PG75 | S1 | RCMD6 |
| 6 | P2 | BLK706 | PG44 | S3 | RCMD7 |
| 7 | | | | | |

REORDERING →

Table 222:

| Index | Physical Address | | | RCMD |
|---|---|---|---|---|
| 0 | P0 | BLK100 | PG5 | S0 | RCMD1 |
| 1 | P1 | BLK301 | PG50 | S1 | RCMD2 |
| 2 | P3 | BLK903 | PG75 | S1 | RCMD3 |
| 3 | P2 | BLK706 | PG44 | S3 | RCMD4 |
| 4 | P0 | BLK200 | PG10 | S3 | RCMD5 |
| 5 | P1 | BLK405 | PG17 | S2 | RCMD6 |
| 6 | P1 | BLK609 | PG33 | S2 | RCMD7 |
| 7 | | | | | |

MEMORY CONTROLLER AND STORAGE DEVICE INCLUDING THE SAME

CROSS-REFERENCE TO RELATED APPLICATION

The present application claims priority under 35 U.S.C. § 119(a) to Korean patent application number 10-2020-0178166, filed on Dec. 18, 2020, with the Korean Intellectual Property Office, and which is incorporated herein by reference in its entirety.

BACKGROUND

Field of Invention

One or more embodiments described herein relate to a memory controller and a storage device including a memory controller.

Description of Related Art

A memory controller may control the storage of data in memory device based on instructions from a host.

A volatile memory device stores data when supplied with power. The data is lost when the power is interrupted. Examples of a volatile memory device include a Static Random Access Memory (SRAM) and a Dynamic Random Access Memory (DRAM).

A nonvolatile memory device stores data even when power is interrupted. Examples of a nonvolatile memory device include a Read Only Memory (ROM), a Programmable ROM (PROM), an Electrically Programmable ROM (EPROM), an Electrically Erasable ROM (EEROM), and a flash memory.

SUMMARY

One or more embodiments described herein provide a memory controller capable of improving performance of a read operation. One or more additional embodiments include a storage device that may be equipped with such a memory controller.

In accordance with an aspect of the present disclosure, there is provided a memory controller including: a command storage including a first read command queue and a second read command queue, the first read command queue configured to store a read command and a physical address according to an index number, the read command to read data stored in a memory device and the physical address corresponding to the read command and including a plane number, a block number, and a page number; a command generation controller configured to provide an erase command to perform an erase operation including erasing data stored in one of a plurality of memory blocks of the memory device, provide a suspend command to suspend the erase operation in response to a request, provide a resume command to resume the erase operation after an operation corresponding to the request is completed, and output a scheduling event signal after the resume command is output; and a command schedule controller configured to, in response to the scheduling event signal search for a first physical address group including physical addresses having a same page number among physical addresses stored in the first read command queue and a second physical address group including all physical addresses having a plane number different from the plane number of the first physical address group, among the physical addresses stored in the first read command queue, reordering a output sequence of the first read command queue by storing together the physical addresses of the first physical address group corresponding to the same page number at same index numbers of the second read command queue and storing respectively the physical addresses of the second physical address group at the index numbers of the second read command queue, and providing a command to perform the read command based on the second read command queue.

In accordance with another aspect of the present disclosure, there is provided a memory controller including: a command storage including a first read command queue and a second read command queue, the first read command queue configured to store a read command and a physical address according to an index number, the read command to read data stored in a memory device and the physical address corresponding to the read command and including a plane number, a block number, and a page number; a command generation controller configured to provide the memory device with a command to perform an erase operation including erasing data stored in one memory block among a plurality of memory blocks of the memory device, or to perform a write operation including storing data in one memory block among the plurality of memory blocks, and to output a scheduling event signal after a predetermined period elapses from a time at which the command is provided to the memory device; and a command schedule controller configured to, in response to the scheduling event signal: search for a first physical address group including physical addresses having the same page number among physical addresses stored in the first read command queue and a second physical address group including all physical addresses having a plane number different from the plane number of the first physical address group, among the physical addresses stored in the first read command queue, reordering a output sequence of the first read command queue by storing together the physical addresses of the first physical address group corresponding to the same page number at same index numbers of the second read command queue and storing respectively the physical addresses of the second physical address group at the index numbers of the second read command queue, and providing a command to perform the read command based on the second read command queue.

In accordance with still another aspect of the present disclosure, there is provided a storage device including: a memory device including a plurality of planes; and a memory controller configured to, in response to a read request: store a read command and a physical address in a first read command queue according to an index number, the read command to perform a read operation including reading data stored in the memory device, schedule read commands and physical addresses, which are stored in the first read command queue, in a second read command queue, when a scheduling event occurs, and provide the memory device with read commands and physical addresses, which are stored in the second read command queue, according to a scheduled sequence, wherein the physical address includes a plane number, a block number, and a page number, and wherein the memory controller is configured to search for a first physical address group including physical addresses having a same page number among the physical addresses stored in the first read command queue and a second physical address group including all physical addresses having a plane number different from the plane number of the first physical address group, among the physical addresses stored in the first read command queue, reorder a output sequence of the first read command queue by storing together the physical addresses of the first physical address group corresponding to the same page number at same index numbers of the second read command queue and storing respectively the physical addresses of the second physical address group at the index numbers of the second read command queue, and provide a command to perform the read command based on the second read command queue.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 8 is a diagram illustrates an embodiment of a command storage.
FIG. 10 illustrates an embodiment of scheduling read commands and physical addresses.
FIG. 12 illustrates an embodiment of scheduling read commands and physical addresses.
FIG. 14 illustrates an embodiment of a command storage.
FIG. 16 illustrates an embodiment of scheduling read commands and physical addresses.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
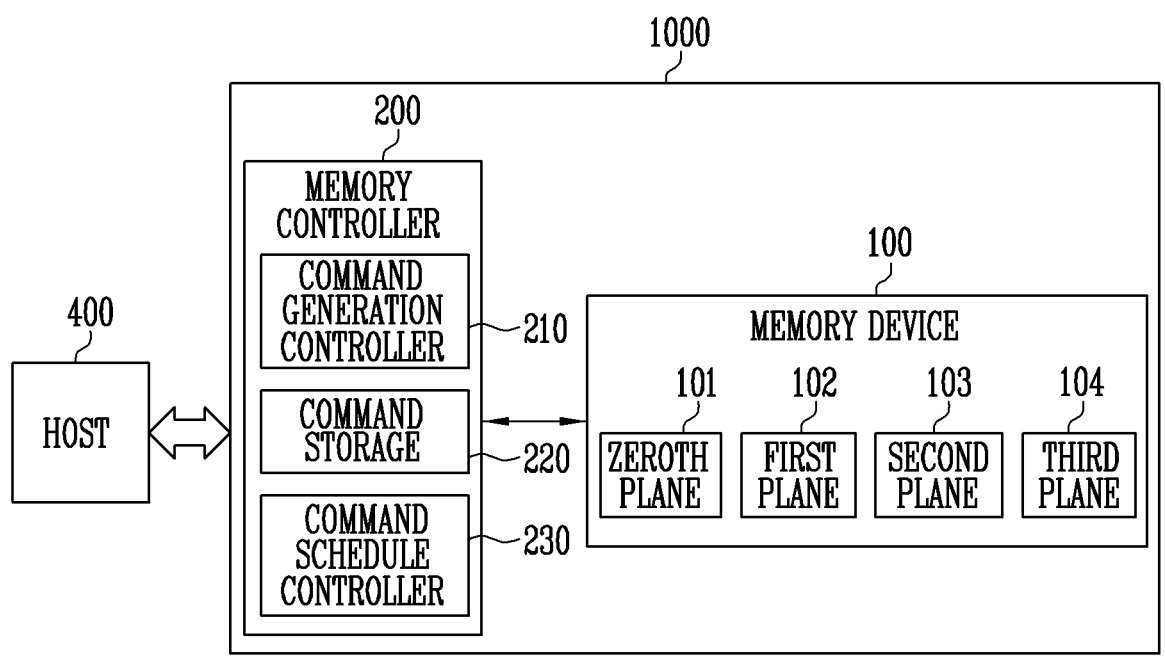
FIG. 1 illustrates an embodiment of a storage system.

FIG. 1 is a diagram illustrating a storage system in accordance with an embodiment. The storage system may be implemented as a data processing system including, for example, a personal computer (PC), a data center, and an enterprise type data storage system, and a direct attached storage (DAS), a data processing system including a storage area network (SAN), a data processing system including a network attached storage, or another type of system or device.

Referring to FIG. 1, the storage system may include a storage device 1000 and a host 400. The storage device 1000 may store data according to a request of the host 400, such as a mobile phone, a smart phone, an MP3 player, a laptop computer, a desktop computer, a game console, a TV, a tablet PC or an in-vehicle infotainment system.

The storage device 1000 may be manufactured as any one of various types of storage devices according to a host interface that is a communication scheme with the host 400. Examples include a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 1000 may be manufactured as any one of various kinds of package types. Examples a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

In an embodiment, one storage device 1000 may be provided as shown in FIG. 1. However, the present disclosure is not limited thereto, and two or more storage devices 1000 may be provided. A plurality of storage devices 1000 may operate by using a redundant array of independent disks (RAID) scheme or a redundant array of inexpensive disks (RAID) scheme, in which the plurality of storage devices 1000 operate as one storage device.

The storage device 1000 may include a memory device 100 and a memory controller 200. The memory device 100 may operate under the control of the memory controller 200. For example, the memory device 100 may receive a command and an address from the memory controller 200, and access a memory cell selected by the address among memory cells. The memory device 100 may perform an operation instructed by the command on the memory cell selected by the address.

The command may be, for example, a program command, a read command, or an erase command. A program command may instruct the memory device to perform a program operation (or write operation). A read command may instruct the memory device 100 to perform a read operation. An erase command may instruct the memory device 100 to perform an erase operation. Thus, operations instructed by corresponding ones of the commands may be, for example, a program operation (or write operation), a read operation, or an erase operation.

Additionally, a program operation may be an operation in which the memory device 100 stores data provided from the host 400 under the control of the memory controller 200. In one embodiment, the program operation may be an operation of storing data in any one memory block among a plurality of memory blocks in the memory device 100.

For example, the memory device 100 may receive a program command, an address, and data, and program the data in a memory cell selected by the address. The data to be programmed in the selected memory cell may be referred to as write data. The write data may include data (or user data) provided from the host 400 and meta data of the data.

A read operation may be an operation in which the memory device 100 reads read data stored in the memory device 100 under the control of the memory controller 200. For example, the memory device 100 may receive a read command and an address, and read data from an area selected by the address in a memory cell array. The data to be read from the selected area among data stored in the memory device 100 may be defined as read data.

An erase operation may be an operation in which the memory device 100 erases data stored in the memory device 100 under the control of the memory controller 200. In one embodiment, an erase operation may erase data stored in any one memory block among the plurality of memory blocks in the memory device 100. For example, the memory device 100 may receive an erase command and an address, and erase data stored in an area selected by the address.

The memory device 100 may be implemented as a volatile memory device or a nonvolatile memory device. Examples of a volatile memory device include a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), and the like. Examples of a nonvolatile memory device may include a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), and a flash memory. The flash memory may include, for example, a NAND flash memory, a vertical NAND flash memory, a NOR flash memory, and the like. For illustrative purposes, it is assumed that the memory device 100 is a NAND flash memory.

The memory device 100 may store write data under the control of the memory controller 200, or may read stored read data and provide the read data to the memory controller 200.

The memory device 100 may include a plurality of planes 101, 102, 103, and 104. The number of planes may be 4 as shown in FIG. 1, but the present disclosure is not limited thereto. Each plane may include a memory cell array including memory cells for storing write data. The memory cell array may include a plurality of memory blocks. A memory block may be a unit for performing an erase operation of erasing data. A memory block may include a plurality pages, with each page corresponding to a unit for performing a program operation of storing write data or a read operation of reading stored read data.

The memory cell may be configured as any one of a Single Level Cell (SLC) storing 1-bit data, a Multi-Level Cell (MLC) storing 2-bit data, a Triple Level Cell (TLC) storing 3-bit data, and a Quadruple Level Cell (QLC) storing 4-bit data. However, the present disclosure is not limited thereto, and the memory cell may store 5 or more-bit data.

In an embodiment, the memory device 100 may perform an operation instructed by a command using, for example, a plane interleaving scheme. A plane interleaving scheme may be a scheme in which operations on respective ones of two or more planes at least partially overlap with each other. For example, the memory device 100 may perform a read operation on a zeroth plane 101 and a read operation on a first plane 102 to overlap with each other. However, the present disclosure is not limited thereto.

The memory controller 200 may control overall operation of the storage device 1000. For example, when power is applied to the storage device 1000, the memory controller 200 may execute instructions (e.g., firmware). When the memory device 100 is a flash memory device, the firmware may include a host interface layer, a flash translation layer, and a flash interface layer. The power may be supplied, for example, from an external supply.

The host interface layer may control an operation between the host 400 and the memory controller 200.

The flash translation layer may translate a logical address provided from the host 400 into a physical address, and may control communications between the memory controller 200 and the memory device 100.

The memory controller 200 may control the memory device 100 to perform a program operation, a read operation, and an erase operation respectively in response to a write request, a read request, and an erase request of the host 400.

In a program operation, the memory controller 200 may provide the memory device 100 with a program command, a physical address, and write data. In an embodiment, in a program operation, the memory controller 200 may provide the memory device 100 with a program command and a physical address. Also, the memory controller 200 may provide a flush command to a buffer memory to provide (or flush) data temporarily stored in the buffer memory to the memory device 100. When the data temporarily stored in the buffer memory is provided to the memory device 100, data temporarily stored in the buffer memory may be erased.

In a read operation, the memory controller 200 may provide the memory device 100 with a read command and a physical address.

In an erase operation, the memory controller 200 may provide the memory device 100 with an erase command and a physical address.

In an embodiment, the physical address may include a plane number, a block number, a page number, and a sub-page number.

The memory controller 200 may autonomously generate a command, an address, and data regardless of any request provided from the host 400. The memory controller 200 may transmit the command, the address, and the data, which are autonomously generated, to the memory device 100. For example, the memory controller 200 may generate a command for performing a background operation, an address, and data. Also, the memory controller 200 may provide memory device 100 with the command, the address, and the data. The command for performing the background operation may be, for example, a program command or a read command.

The background operation may be at least one of wear leveling, read reclaim, and garbage collection.

Wear leveling may include, for example, static wear leveling, dynamic wear leveling, etc. Static wear leveling may include an operation of storing a number of times memory blocks are erased, and moving cold data on which any erase operation or any write operation is hardly performed to a memory block which is erased a largest number of times. Dynamic wear leveling may include an operation of storing a number of times memory blocks are erased, and programing data in a memory block which is erased a smallest number of times.

Read reclaim may include an operation of moving data stored in a memory block to another memory block before an uncorrectable error occurs in the data stored in the memory block.

Garbage collection may include an operation of copying valid data included in a bad block among memory blocks to a free block, and erasing invalid data in the bad block. Copying valid data in a bad block to a free block may include moving the valid data in the bad block to the free block.

In an embodiment, the memory controller 200 may control the memory device 100 to perform a background operation in predetermined period, e.g., an idle period or another period. An idle period may include, for example, a period in which any request of the host 400 is not provided. In one embodiment, the idle period may include a period corresponding to that from a time at which a response to a request of the host 400 is provided to the host 400 to a time at which a subsequent request of the host 400 is provided to the storage device 1000.

In an embodiment, the memory controller 200 may control two or more memory devices 100. The memory controller 200 may control the memory devices 100 according, for example, to an interleaving scheme to improve operational performance. An interleaving scheme may include controlling operations on the two or more memory devices 100 to overlap with each other.

The memory controller 200 may sequentially store a command and a physical address in at least one command queue, and may provide the memory device with the command and the physical address, which are stored in the command queue, according to a scheduled sequence. The command and the physical address, which are stored in the command queue, may be output according to a first-in first-out (FIFO) scheme. However, the present disclosure is not limited thereto.

For example, the memory controller 200 may sequentially store a read command and a physical address in a read command queue, and sequentially provide the read command and the physical address, which are stored in the read command queue, to the memory device 100.

In one example, the memory controller 200 may store a program command and a physical address in a program command queue, and store a read command and a physical address in a read command queue. Also, the memory controller 200 may first provide the program command and the physical address to the memory device 100 and then provide the read command and the physical address to the memory device 100.

The memory controller 200 may provide an erase command to the memory device 100. While the memory device 100 performs an erase operation in response to the erase command, the memory controller 200 may receive a request (e.g., a read request) from the host 400. The memory controller 200 may provide a suspend command in response to the request of the host 400. The suspend command may instruct the memory device 100 to suspend the erase operation. After the suspend command is provided to the memory device 100, the memory controller 200 may provide the memory device 100 with a command (e.g., a read command) instructing the memory device 100 to perform an operation corresponding to the request of the host 400. The memory device 100 may suspend the erase operation in response to the suspend command, and perform an operation (e.g., a read operation) in response to the command (e.g., the read command). After the operation corresponding to the request is completed, the memory controller 200 may provide a resume command to the memory device 100. A resume command may instruct the memory device 100 to resume the erase operation. The memory device 100 may resume the erase operation in response to the resume command.

When the erase command is resumed in response to the resume command, there may be a certain preparation time until the erase operation is normally performed. This preparation time may be a time delayed until the erase operation is normally performed. When the host 400 provides a request (e.g., a read request) to the memory controller 200 during the preparation time, a command (e.g., a read command) instructing the memory device 100 to perform an operation corresponding to the request may be continuously stored in a command queue. When commands are continuously queued in the command queue, a response to the request of the host 400 may be delayed.

When commands instructing an operation on any one plane among the plurality of planes 101, 102, 103, and 104 are sequentially stored in a command queue, a command to be output next may be provided to the memory device 100 only when an operation instructed by a command output first is completed. For example, while the operation instructed by the command output first is performed, the command to be output next may be queued in the command queue. For example, when a program command instructing a program operation on the zeroth plane 101 and a read command instructing a read operation on the zeroth plane 101 are sequentially stored in each command queue, based on the program command the read command, the read command may be queued in the command queue while the program operation is performed.

When the operation instructed by the command output first is not completed, a read operation may be delayed when read commands and physical addresses are continuously queued in the read command queue.

The memory controller 200 may store read commands and physical addresses in a first read command queue according to an index number in response to the read request from the host 400. Also, when a scheduling event occurs, the memory controller 200 may schedule the scheduled read commands and the scheduled physical addresses, which are stored in the first read command queue, in a second read command queue. Also, the memory controller 200 may provide the memory device 100 with the read commands and the physical addresses, which are stored in the second read command queue, according to a scheduled sequence.

In an embodiment, when the scheduling event occurs, the memory controller 200 may search for a first physical address group including physical addresses including the same page number among the physical addresses stored in the first read command queue. Also, the memory controller 200 may search for a second physical address group including all physical addresses including a plane number different from all plane numbers of the first physical address group among the physical addresses stored in the first read command queue. Also, the memory controller 200 may sequentially schedule the first physical address group and the second physical address group in consecutive index numbers of the second read command queue. The number of physical address in a physical address group may be one or more, and the number of physical address groups may be one or more.

The scheduling event may occur after the resume command is provided to the memory device 100. For example, the scheduling event may occur in a period corresponding to that from a time at which the resume command is provided to the memory device 100 to a time at which the suspend command is provided to the memory device 100. The scheduling event may occur, for example, before the erase operation or the program operation (or write operation) is completed.

The memory controller 200 may include a command generation controller 210, a command storage 220, and a command schedule controller 230. The command generation controller 210 may generate a command in response to a request of the host 400. For example, the command generation controller 210 may generate a read command in response to a read request of the host 400. For example, the command generation controller 210 may generate a program command in response to a write request of the host 400. For example, the command generation controller 210 may generate an erase command in response to an erase request of the host 400. For example, the command generation controller 210 may generate a suspend command or a resume command.

The command generation controller 210 may translate a logical address from the host 400 into a physical address. The command generation controller 210 may be implemented, for example, as a flash translation layer.

The command generation controller 210 may provide the memory device 100 with a command and a physical address, which are stored in the command storage 220. In an embodiment, the command generation controller 210 may provide the erase command to the memory device 100, may provide the suspend command to the memory device 100 in response to a request provided by the host 400 during an erase operation, and may provide the resume command to the memory device 100 when an operation corresponding to the request is completed.

In an embodiment, after the resume command is provided to the memory device 100, the command generation controller 210 may provide a scheduling event signal to the command schedule controller 230. An embodiment is described with reference to FIG. 5.

In one embodiment, the command generation controller 210 may provide the scheduling event signal to the command schedule controller 230, after a predetermined period elapses from a time at which a command instructing the memory device 100 to perform an erase operation or a write operation is provided to the memory device 100. An embodiment is described with reference to FIGS. 6 and 7.

The command storage 220 may store a command and a physical address and may include at least one read command queue. For example, the command storage 220 may include a read command queue, a program command queue and/or an erase command queue.

The command schedule controller 230 may compare physical addresses stored in the command storage 220 in response to the scheduling event signal. The command schedule controller 230 may search for physical addresses including the same page number among the physical addresses stored in the command storage 220. A group including physical addresses having the same page number may be defined as a first physical address group. The command schedule controller 230 may search for a second physical address group, except the first physical address group, among the physical addresses stored in the command storage 220. The second physical address group may be a group including physical addresses having a plane number different from all plane numbers of the first physical address group.

The command schedule controller 230 may sequentially schedule the first physical address group and the second physical address group in the second read command queue, such that a read operation on the first physical address group and a read operation on the second physical address group are performed, for example, according to the plane interleaving scheme. An embodiment is described with reference to FIGS. 10 to 13.

The physical addresses in the first physical address group may be scheduled in the same index number of the second read command queue. In an embodiment, when the first physical address group is not searched, the read command and the physical address, which are stored in the command storage 220, may be again scheduled such that a read operation is performed on planes as many as possible using the plane interleaving scheme. An embodiment is described with reference to FIG. 14 to 17.

The storage device 1000 may include the buffer memory for storing data only while power is supplied from a power source. The buffer memory may be in the memory controller 200. Alternatively, the buffer memory may be disposed outside of and coupled to the memory controller 200. The buffer memory may be, for example, a volatile memory device. Examples of the buffer memory include a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), and a Rambus Dynamic Random Access Memory (RDRAM).

The host 400 may communicate with the storage device 1000 through an interface. The interface may be implemented, for example, as a serial advanced technology attachment (SATA) interface, a SATA express (SATAe) interface, a serial attached small computer system interface (SAS) interface, a peripheral component interconnect express (PCIe) interface, a non-volatile memory express (NVMe) interface, an advanced host controller interface (AHCI) interface, or a multimedia card interface. However, the present disclosure is not limited thereto.

The host 400 may store data in the storage device 1000 or may communicate with the storage device 1000 to acquire data stored in the storage device 1000.

In an embodiment, the host 400 may provide the storage device 1000 with a write request for requesting the storage device 1000 to store data. Also, the host 400 may provide the storage device 1000 with a write request, data, and a logical address for identifying the data.

The storage device 1000 may store write data in response to the write request provided from the host 400. The write data may include the data provided by the host 400 and meta data in the memory device 100. The storage device 1000 may also provide the host 400 with a response indicating storing of the write data has been completed.

In an embodiment, the host 400 may provide the storage device 1000 with a read request that requests the storage device 1000 to provide data stored in the storage device 1000 to the host 400. The host 400 may provide the read request and a read address to the storage device 1000.

The storage device 1000 may read, from the memory device 100, read data corresponding to the read address provided by the host 400 and may provide the host 400 with the read data as a response to the read request. The data may be read in response to a read request from host 400.

Figure 2:
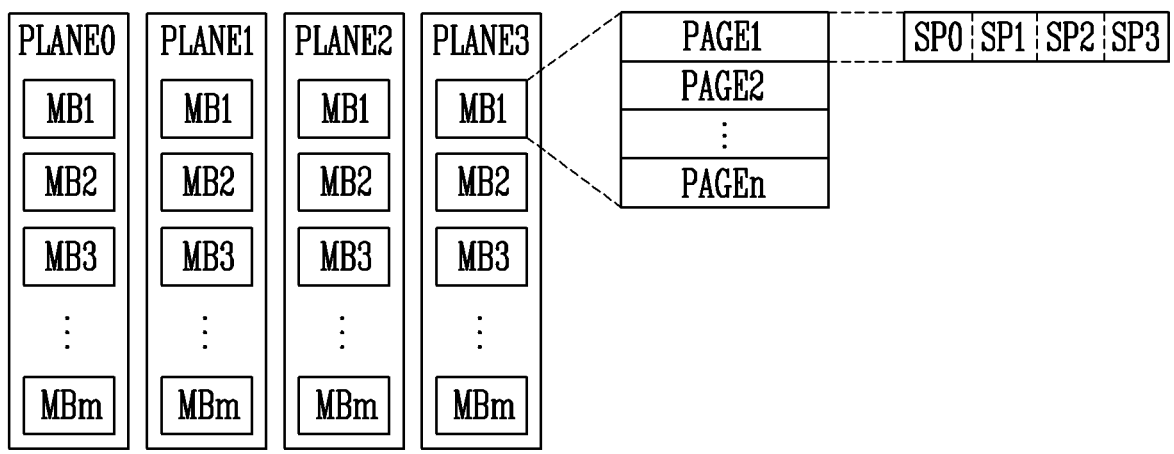
FIG. 2 illustrates an embodiment of a plurality of planes.

FIG. 2 is a diagram illustrating an embodiment of a plurality of planes PLANE0, PLANE1, PLANE2, and PLANE3, which, for example may correspond to planes 101, 102, 103, and 104 shown in FIG. 1. Each of the planes PLANE0, PLANE1, PLANE2, and PLANE3 may include a plurality of memory blocks MB1, MB2, MB3, . . . , and MBm, where m is natural number of 2 or more.

In an embodiment, the memory blocks MB1, MB2, MB3, . . . , and MBm may be divided into system blocks and user blocks. For example, a first memory block MB1 and a second memory bock MB2 may be system blocks, and a third to mth memory blocks MB3 to MBm may be user blocks, but the present disclosure is not limited thereto.

A system block may store meta data including map data, validity data, uncorrectable error data, operation data, and the like. The map data may be data representing a mapping relationship between logical and physical addresses. The validity data may be data representing validity of data (or user data) provided from the host 400. The uncorrectable error data may be data representing that data (or user data) provided from the host 400 is data having an uncorrectable error. The operation data may be data representing whether a physical address stored in a command queue is an address translated from a logical address from the host 400 or an address generated to perform a background operation. However, the present disclosure is not limited thereto.

A user block may store data, for example, data provided from the host 400 and meta data. A plurality of user blocks may be included.

Each of the memory blocks MB1, MB2, MB3, . . . , and MBm may include a plurality of pages PAGE1, PAGE2, . . . , and PAGEn, where n is a natural number of 2 or more. Each of the pages PAGE1, PAGE2, . . . , and PAGEn may be divided into virtual sub-pages SP0, SP1, SP2, and SP3 according to a read unit as a unit for performing a read operation. In one embodiment, the read unit may be predetermined based on a size of the page and a number of the sub-pages. For example, when the size of the page 16 KB and the number of the sub-pages is 4, the read unit may be 4 KB. However, the present disclosure is not limited thereto. In one embodiment, the terms "sub-page," "slice," "section," and the like may have the same meaning.

In an embodiment, the physical address may include a plane number, a bock number, a page number, and a sub-page number. The plane number may indicate any one plane among the planes PLANE0, PLANE1, PLANE2, and PLANE3. The block number may indicate any one memory block among a plurality of memory blocks MB1, MB2, MB3, . . . , and MBm in one plane. The page number may indicate any one page among a plurality of pages PAGE1, PAGE2, . . . , and PAGEn in one memory block. The sub-page number may indicate any one of sub-pages SP0, SP1, SP2, and SP3 in one page.

Figure 3:
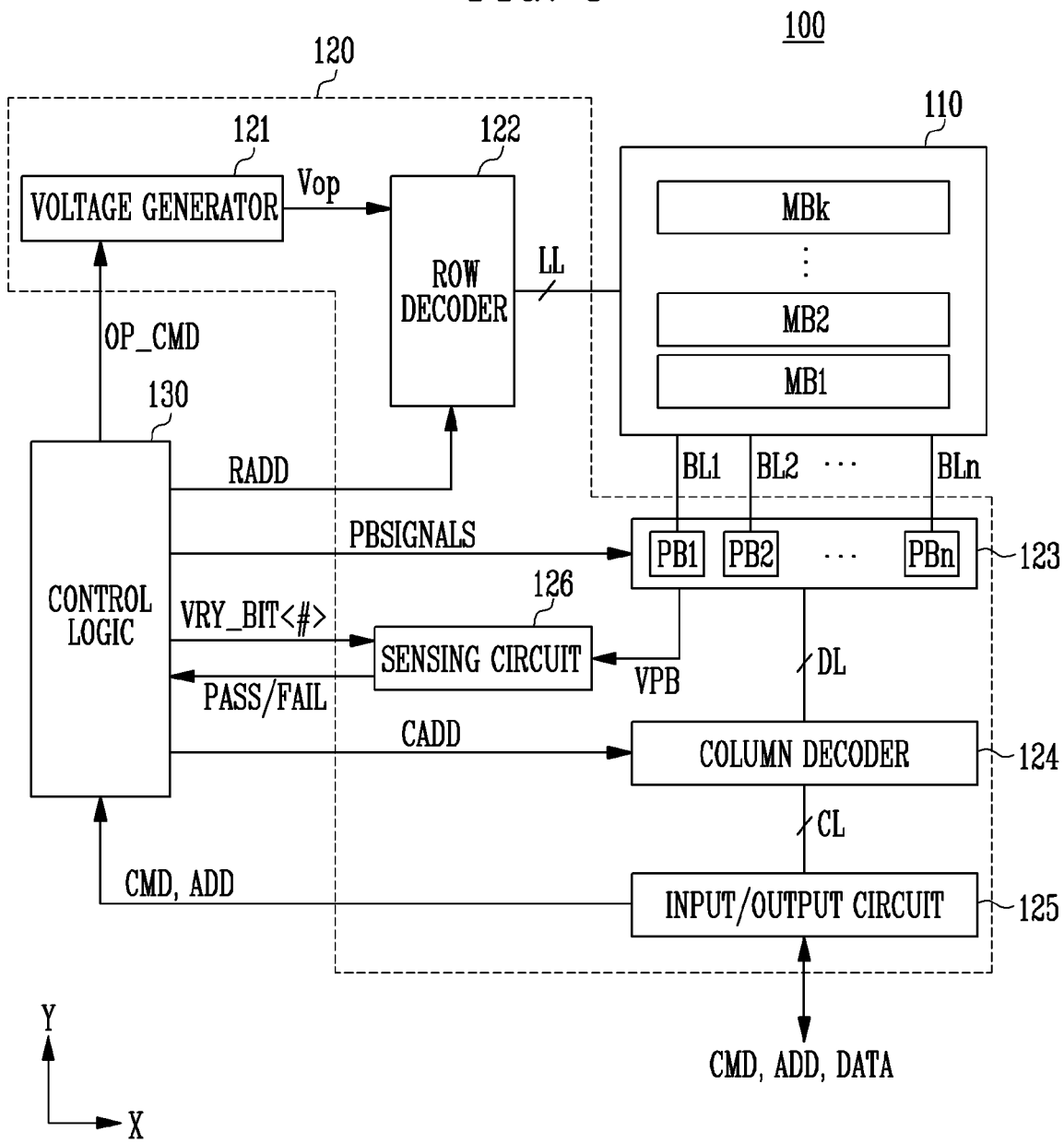
FIG. 3 illustrates an embodiment of a memory device.

FIG. 3 is a diagram illustrating an embodiment of a memory device 100, which may include a memory cell array 110, a peripheral circuit 120, and a control logic 130. The memory cell array 110 may include a plurality of memory blocks MB1 to MBk (k is a positive integer). The number of memory blocks MB1 to MBk shown is merely an example and may be a different number in another embodiment.

Each of the memory blocks MB1 to MBk may be connected to local lines LL and bit lines BL1 to BLn (n is a positive integer). The local lines LL may be connected to a row decoder 122 and to respective ones of the memory blocks MB1 to MBk. The local lines LL may include a first select line, a second select line, and a plurality of word lines arranged between the first select line and the second select line. The local lines LL may further include dummy lines arranged between the first select line and the word lines, dummy lines arranged between the second select line and the word lines, and pipe lines.

The bit lines BL1 to BLn may be commonly connected to the memory blocks MB1 to MBk.

The memory blocks MB1 to MBk may be implemented in a two-dimensional or three-dimensional structure. In a two-dimensional structure, memory cells in the memory blocks MB1 to MBk may be arranged in a direction parallel to a substrate. In a three-dimensional structure, memory cells in the memory blocks MB1 to MBk may be stacked in a direction vertical to a substrate.

The peripheral circuit 120 may include a voltage generator 121, the row decoder 122, a page buffer group 123, a column decoder 124, an input/output circuit 125, and a sensing circuit 126. The voltage generator 121 may generate various operating voltages Vop used for a program operation, a read operation, and an erase operation in response to an operation command OP_CMD. Also, the voltage generator 121 may selectively discharge the local lines LL in response to the operation command OP_CMD. For example, the voltage generator 121 may generate a program voltage, a verify voltage, pass voltages, a turn-on voltage, a read voltage, an erase voltage, a source line voltage, and the like under the control of the control logic 130.

In an embodiment, the voltage generator 121 may generate an internal power voltage by regulating external power voltage. The internal power voltage generated by the voltage generator 121 is used as an operating voltage of the memory device 100.

In an embodiment, the voltage generator 121 may generate a plurality of voltages using the external power voltage or the internal power voltage. For example, the voltage generator 121 may include a plurality of pumping capacitors for receiving the internal power voltage and generating a plurality of voltages by selectively activating the pumping capacitors under the control of the control logic 130. The generated voltages may be supplied to the memory cell array 110 by the row decoder 122.

The row decoder 122 may transfer the operating voltages Vop to the local lines LL in response to a row address RADD. The operating voltages Vop may be transferred to a selected memory block of the memory blocks MB1 to MBk through the local lines LL.

For example, in a program operation, the row decoder 122 may apply a program voltage to a selected word line and may apply a program pass voltage (having a level lower than that of the program voltage) to unselected word lines. In a program verify operation, the row decoder 122 may apply a verify voltage to the selected line and may apply a verify pass voltage (higher than the verify voltage) to the unselected word lines.

In a read operation, the row decoder 122 may apply a read voltage to the selected word line and may apply a read pass voltage (higher than the read voltage) to the unselected word lines.

In an erase operation, the row decoder 122 may select one memory block according to a decoded address. In the erase operation, the row decoder 122 may apply a reference (e.g., ground) voltage to word lines connected to the selected memory block.

The page buffer group 123 may include first to nth page buffers PB1 to PBn connected to the memory cell array 110 through first to nth bit lines BL1 to BLn, respectively. The first to nth page buffers PB1 to PBn may operate under the control of the control logic 130. For example, the first to nth page buffers PB1 to PBn may operate in response to page buffer control signals PBSIGNALS. For example, the first to nth page buffers PB1 to PBn may temporarily store data received through the first to nth bit lines BL1 to BLn, or may sense a voltage or current of the bit lines BL1 to BLn in a read operation or a verify operation.

In a program operation, when the program voltage is applied to the selected word line, the first to nth page buffers PB1 to PBn may transfer data DATA received through the column decoder 124 and the input/output circuit 125 to selected memory cells through the first to nth bit lines BL1 to BLn. Memory cells of a selected page are programmed according to the transferred data DATA. A memory cell connected to a bit line to which a program allow voltage (e.g., a ground voltage) is applied may have an increased threshold voltage. A threshold voltage of a memory cell connected to a bit line to which a program inhibit voltage (e.g., a power voltage) is applied may be maintained.

In a verify operation, the first to nth page buffers PB1 to PBn may sense data stored in selected memory cells from the selected memory cell through the first to nth bit lines BL1 to BLn.

In a read operation, the first to nth page buffers PB1 to PBn may sense data DATA from memory cells of a selected page through the first to nth bit lines BL1 to BLn, and may output the sensed data DATA to the input/output circuit 125 under the control of the column decoder 124.

In an erase operation, the first to nth page buffers PB1 to PBn may float the first to nth bit lines BL1 to BLn.

The column decoder 124 may transfer data between the input/output circuit 125 and the page buffer group 123 in response to a column address CADD. For example, the column decoder 124 may exchange data with the page buffers PB1 to PBn through data lines DL, or may exchange data with input/output circuit 125 through column lines CL. The input/output circuit 125 may transfer a command CMD and an address ADD, which are transferred from the memory controller 200, to the control logic 130 or may exchange data DATA to the column decoder 124.

In a read operation or a verify operation, the sensing circuit 126 may generate a reference current in response to an allow bit VRY_BIT<#>, and may output a pass signal PASS or a fail signal FAIL by comparing a sending voltage VPB received from the page buffer group 123 with a reference voltage generated by the reference voltage.

The control logic 130 may control the peripheral circuit 120 by outputting the operation command OP_CMD, the row address RADD, the page buffer control signal PBSIGNALS, and the allow bit VRY_BIT<#> in response to the command CMD and the address ADD.

Figure 4:
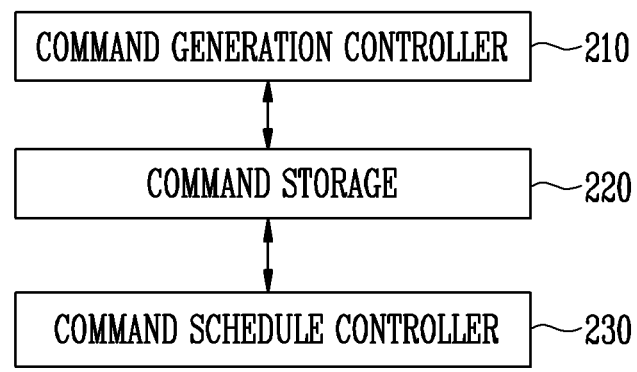
FIG. 4 illustrates an embodiment of a memory controller.

FIG. 4 is a diagram illustrating an embodiment of the memory controller 200, which may include a command generation controller 210, a command storage 220, and a command schedule controller 230.

The command generation controller 210 may receive a read request from the host 400 and may generate a read command instructing the memory device to read data stored in the memory device in response to the read request. A read command may be generated, for example, in response to a read request currently from the host 400.

The command generation controller 210 may translate a logical address from the host 400 to a physical address. The physical address may be provided together with the read command. In one embodiment, the physical address may be provided together with a read command stored in the command storage 220.

The command generation controller 210 may input the read command and the physical address to the command storage 220. The command generation controller 210 may generate a scheduling event signal and may provide the scheduling event signal to the command schedule controller 230.

The command storage 230 may sequentially store read commands instructing the memory device 100 to read data stored in the memory device 100 and a physical address corresponding to each read command. In an embodiment, the command storage 230 may include a first read command queue and a second read command queue. The first read command queue may sequentially store a read command generated in response to a read request from the host 400 and a physical address corresponding to the read command. The second read command queue may realign and store read commands and physical addresses, which are stored in the first read command queue, when a predetermined scheduling event occurs.

The command schedule controller 230 may receive a scheduling event signal. When the scheduling event signal is received, the command schedule controller 230 may search for a first physical address group among the physical addresses stored in the first read command queue. Also, the command schedule controller 230 may search for a second physical address group among the physical addresses stored in the first read command queue. Also, the command schedule controller 230 may sequentially schedule the first physical address group and the second physical address group in consecutive index numbers of the second read command queue.

Figure 5:
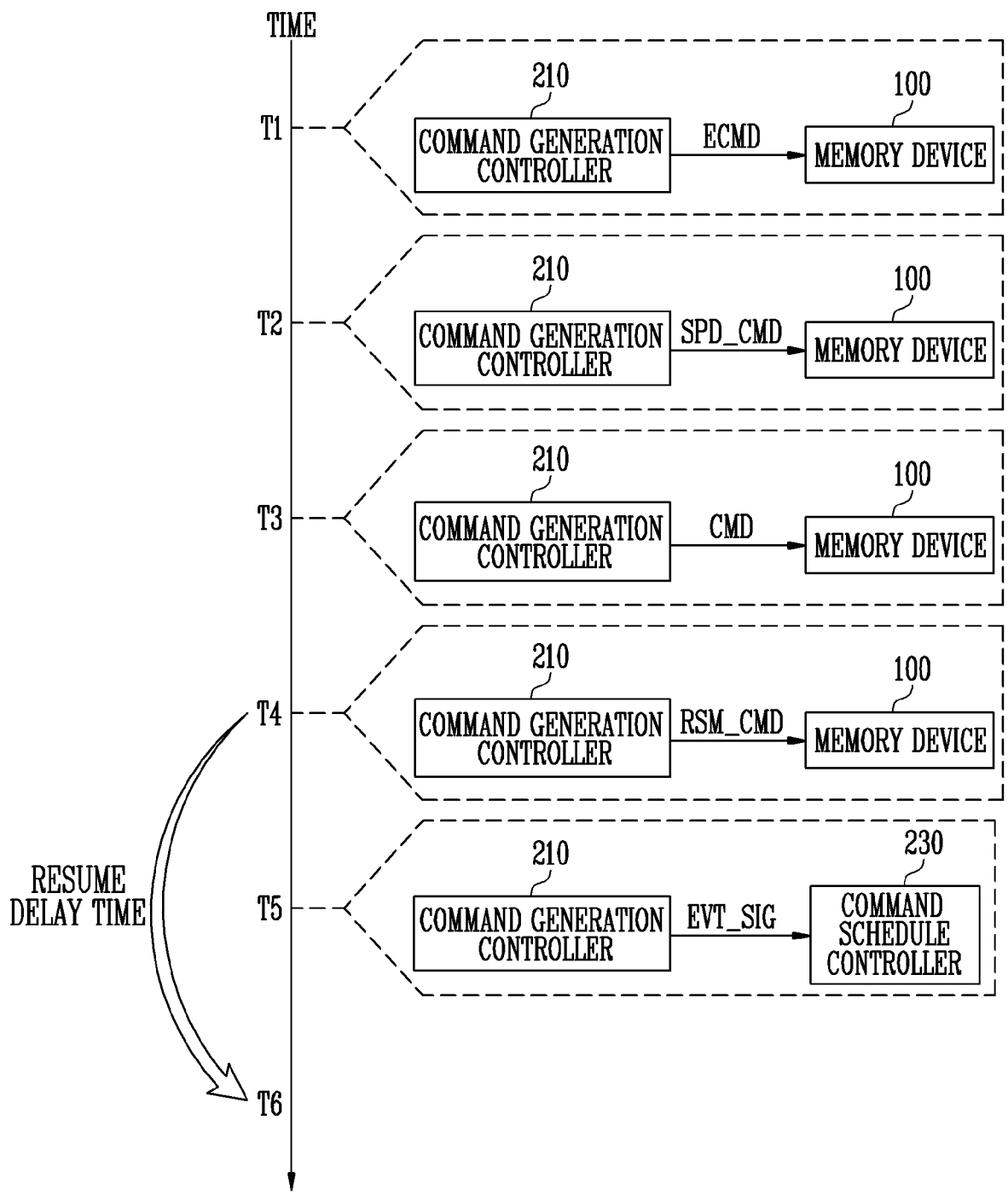
FIG. 5 illustrates an embodiment of providing a scheduling event signal.

FIG. 5 is a diagram illustrating an embodiment of providing a scheduling event signal. Referring to FIG. 5, at time T1, the command generation controller 210 may provide an erase command ECMD to the memory device 100. The memory device 100 may start an erase operation in response to the erase command ECMD.

At time T2, the host 400 may provide a request to the command generation controller 210. The request of the host 400 may be, for example, a write request or a read request. The command generation controller 210 may provide a suspend command SPD_CMD to the memory device 100. The memory device 100 may suspend the erase operation started at the time T1 in response to the suspend command SPD_CMD.

At time T3, the command generation controller 210 may provide the memory device 100 with a command CMD corresponding to the request of the host 400, which is provided at the time T2. When the request of the host 400 is the write request, the command CMD may be a program command. In one embodiment, when the request of the host 400 is the read request, the command CMD may be a read command. The memory device 100 may perform an operation instructed by the command CMD in response to the command CMD.

At time T4, the memory device 100 may complete the operation instructed by the command CMD. The command generation controller 210 may provide a resume command RSM_CMD to the memory device 100. The memory device 100 may resume the erase operation suspended at the time T2 in response to the resume command RSM_CMD. A certain preparation time may be used for the memory device 100 to normally perform the erase operation. This preparation time may correspond to a resume delay time. For example, when the erase operation is resumed at time T4, the erase operation may be normally performed from T6 after the resume delay time elapses.

During the resume delay time, the host 400 may provide a read request to the command generation controller 210. A read command and a physical address may be sequentially stored in the first read command queue in the command storage 220, whenever the read request of the host 400 is provided to the command generation controller 210. When read commands and physical addresses, which are stored in the first read command queue, are continuously queued in the first read command queue, a response to the read request of the host 400 may be delayed.

In an embodiment, at time T5 after the resume command RSM_CMD is provided to the memory device 100, the command generation controller 210 may provide a scheduling event signal EVT_SIG to the command schedule controller 230.

Figure 6:
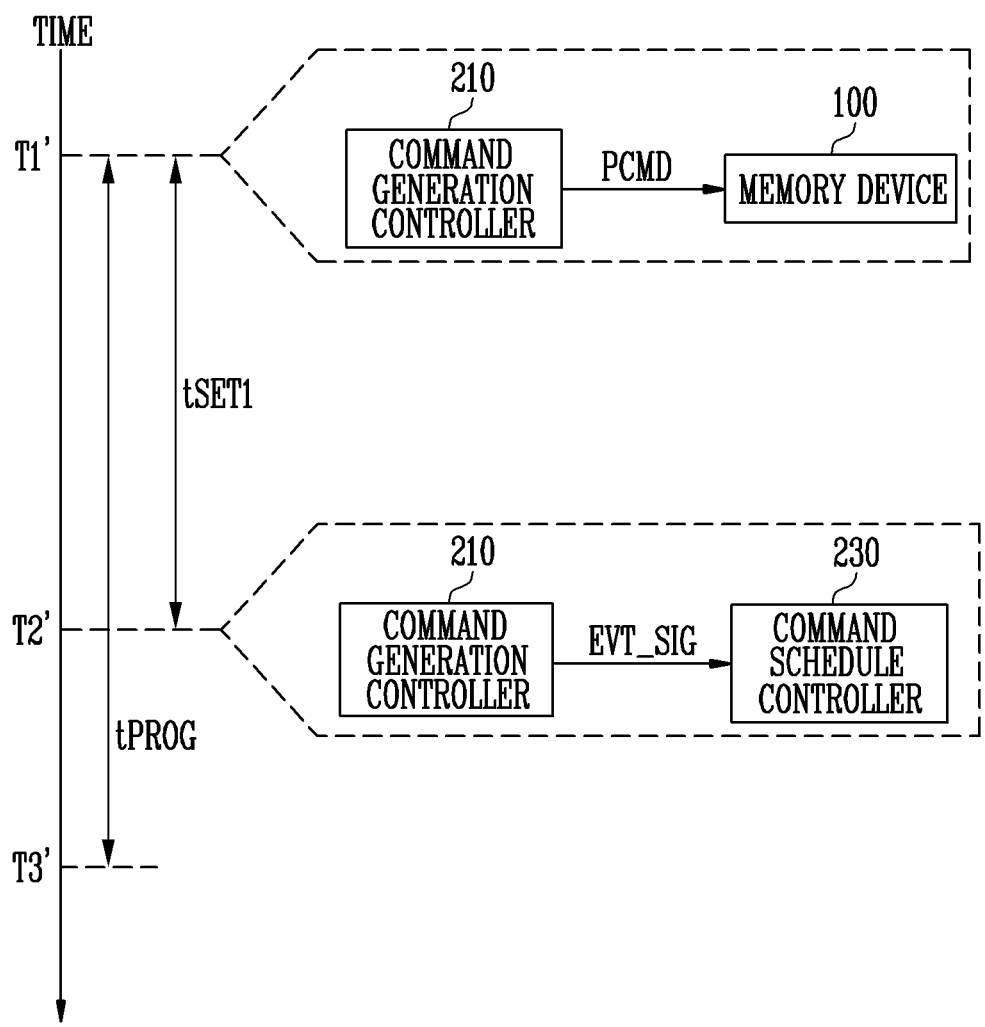
FIG. 6 illustrates an embodiment of providing the scheduling event signal.

FIG. 6 is a diagram illustrating an embodiment of providing the scheduling event signal. Referring to FIG. 6, the command generation controller 210 may not generate the suspend command SPD_CMD and the resume command RSM_CMD. After a predetermined period elapses from when the command CMD shown in FIG. 5 is provided to the memory device 100, the command generation controller 210 may output the scheduling event signal EVT_SIG.

At a time T1', the command generation controller 210 may provide a program command PCMD to the memory device 100. The memory device 100 may start a program operation (or write operation) in response to the program command PCMD.

A time for the program operation to be normally completed may be a program operation time tPROG. Information (or data) on the program operation time tPROG may be stored in a memory block allocated as a CAM block, among a plurality of memory blocks MB1, MB2, MB3, . . . , and MBm in the memory device 100. The memory controller 200 may acquire the information on the program operation time tPROG from the memory device 100 in booting. The program operation time tPROG may be, for example, a period corresponding to that from the time T1' to a time T3'.

Before the program operation time tPROG elapses after a time at which the program command PCMD is provided to the memory device 100, the command generation controller 210 may provide the scheduling event signal EVT_SIG to the command schedule controller 230.

In an embodiment, at a time at which a predetermined first reference time tSET1 elapses after the time at which the program command PCMD is provided to the memory device 100, the command generation controller 210 may provide the scheduling event signal EVT_SIG to the command schedule controller 230. For example, the time at which the predetermined first reference time tSET1 elapses after time T1' may be T2'.

Information (or data) on the first reference time tSET1 may be stored in the memory block allocated as the CAM block, among the plurality of memory blocks MB1, MB2, MB3, . . . , and MBm in the memory device 100. The memory controller 200 may acquire the information on the first reference time tSET1 from the memory device 100 in booting. In an embodiment, the first reference time tSET1 may be shorter than the program operation time tPROG. At time T3', the command generation controller 210 may provide the memory device 100 with a command for checking a result of the program operation.

Figure 7:
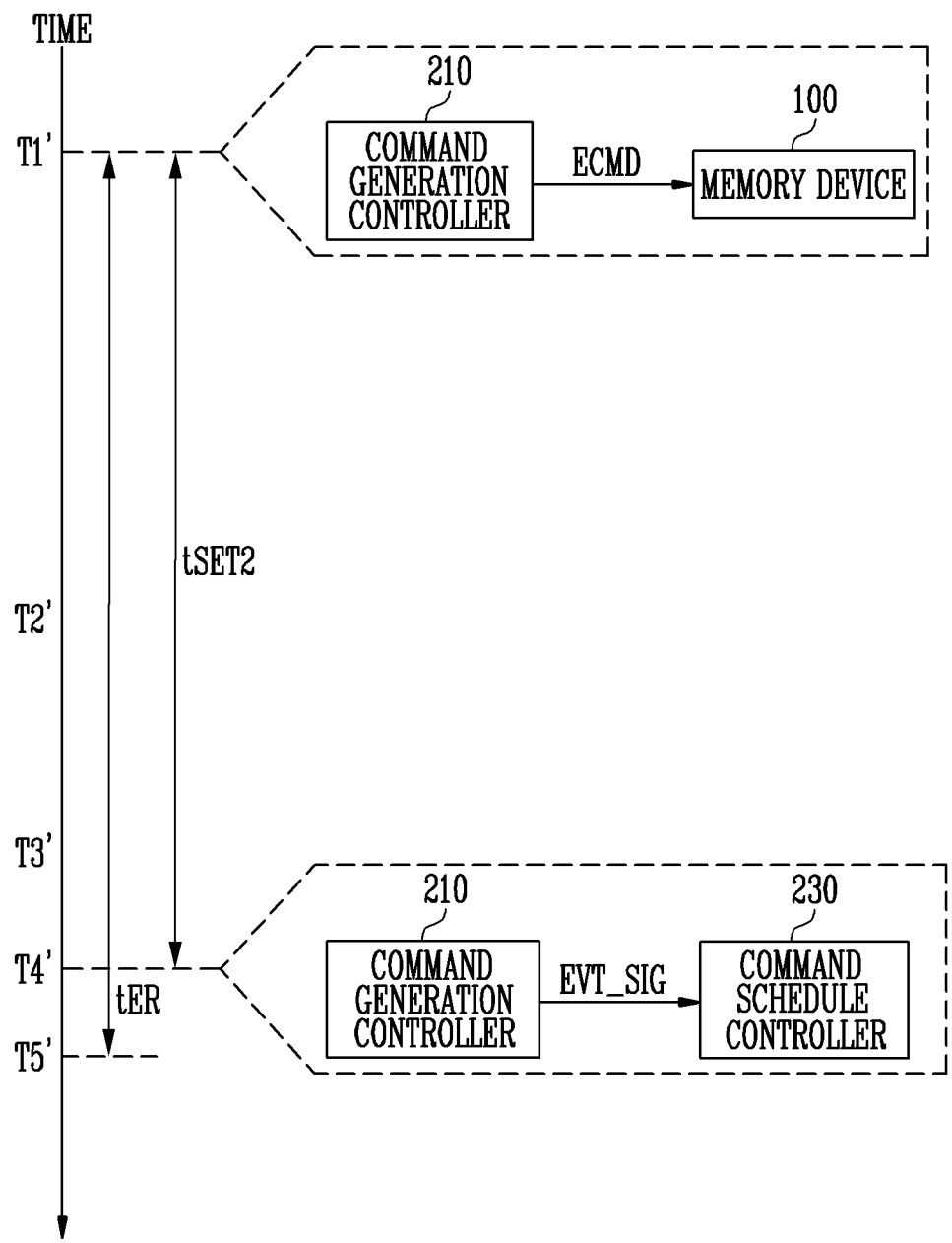
FIG. 7 illustrates an embodiment of providing the scheduling event signal.

FIG. 7 is a diagram illustrating an embodiment of providing the scheduling event signal. Referring to FIG. 7, at time T1', the command generation controller 210 may provide an erase command ECMD to the memory device 100. The memory device 100 may start an erase operation in response to the erase command ECMD.

A time for the erase operation to be normally completed may be an erase operation time tER. Information (or data) on the erase operation time tER may be stored in a memory block allocated as a CAM block, among a plurality of memory blocks MB1, MB2, MB3, . . . , and MBm in the memory device 100. The memory controller 200 may acquire the information on the erase operation time tER from the memory device 100 in booting. The erase operation time tER may be, for example, a period corresponding to that from time T1' to a time T5'. In one embodiment, the erase operation time tER may be longer than the program operation time tPROG of FIG. 6.

Before the erase operation time tER elapses after a time at which the erase command ECMD is provided to the memory device 100, the command generation controller 210 may provide the scheduling event signal EVT_SIG to the command schedule controller 230.

In an embodiment, at a time at which a predetermined second reference time tSET2 elapses after the time at which the erase command ECMD is provided to the memory device 100, the command generation controller 210 may provide the scheduling event signal EVT_SIG may be provided to the command schedule controller 230. For example, the time at which the predetermined second reference time tSET2 elapses after the time T1' may be T4'.

Information (or data) on the second reference time tSET2 may be stored in the memory block allocated as the CAM block, among the plurality of memory blocks MB1, MB2, MB3, . . . , and MBm in the memory device 100. The memory controller 200 may acquire the information on the second reference time tSET2 from the memory device 100 in booting. In an embodiment, the second reference time tSET2 may be shorter than the erase operation time tER. In an embodiment, the second reference time tSET2 may be equal to the first reference time tSET1 or be longer than the first reference time tSET1.

FIG. 8 is a diagram illustrating an embodiment of the command storage 220, which may include a first read command queue 221 and a second read command queue 222.

Referring to FIG. 8, the first read command queue 221 may sequentially store a read command RCMD and a physical address Physical Address according to an index number. For example, a physical address including a plane number 0 PO, a block number 100 BLK100, a page number 5 PG5, and a sub-page number 0 S0 and a read command RCMD1 may be stored in an index number 0 Index0 of the first read command queue 221.

For example, a physical address including the plane number 0 PO, a block number 200 BLK200, a page number 10 PG10, and a sub-page number 3 S3 and a read command RCMD2 may be stored in an index number 1 Index1 of the first read command queue 221.

For example, a physical address including a plane number 3 P3, a block number 303 BLK3013, a page number 50 PG50, and a sub-page number 2 S2 and a read command RCMD3 may be stored in an index number 2 Index2 of the first read command queue 221.

For example, a physical address including the plane number 0 P03, the block number 100 BLK100, the page number 5 PG5, and the sub-page number 3 S3 and a read command RCMD4 may be stored in an index number 3 Index3 of the first read command queue 221.

For example, a physical address including a plane number 2 P02, a block number 206 BLK206, the page number 10 PG10, and the sub-page number 2 S2 and a read command RCMD5 may be stored in an index number 4 Index4 of the first read command queue 221.

The read commands RCMD1, RCMD2, RCMD3, RCMD4, and RCMD5 and the physical addresses, which are respectively stored in the index numbers Index0, Index1, Index2, Index3, and Index4 of the first read command queue 221, may be sequentially provided to the memory device 100. For example, the read commands RCMD1, RCMD2, RCMD3, RCMD4, and RCMD5 and the physical addresses may be sequentially provided from a lowest number of the index numbers Index0, Index1, Index2, Index3, and Index4 of the first read command queue 221. However, the present disclosure is not limited thereto.

The second read command queue 222 may be empty before a scheduling event occurs.

When an operation indicated by a command (which is currently performed in the memory device 100) is not completed, the read commands RCMD1, RCMD2, RCMD3, RCMD4, and RCMD5 and the physical addresses in the first read command queue 221 may continuously stand by in the respective index numbers of the first read command queue 221 until the operation currently performed in the memory device 100 is completed. A time (or read busy time tR) for which a read operation is performed in response to a read request of the host 400 is increased, the performance of a read operation is decreased, and a read response to the read request of the host 400 is delayed.

In order to alleviate this concern, the first read command queue 221 may again be scheduled according to whether the physical addresses stored in the first read command queue 221 are to be provided to the memory device 100 according to a specific output sequence.

Figure 9:
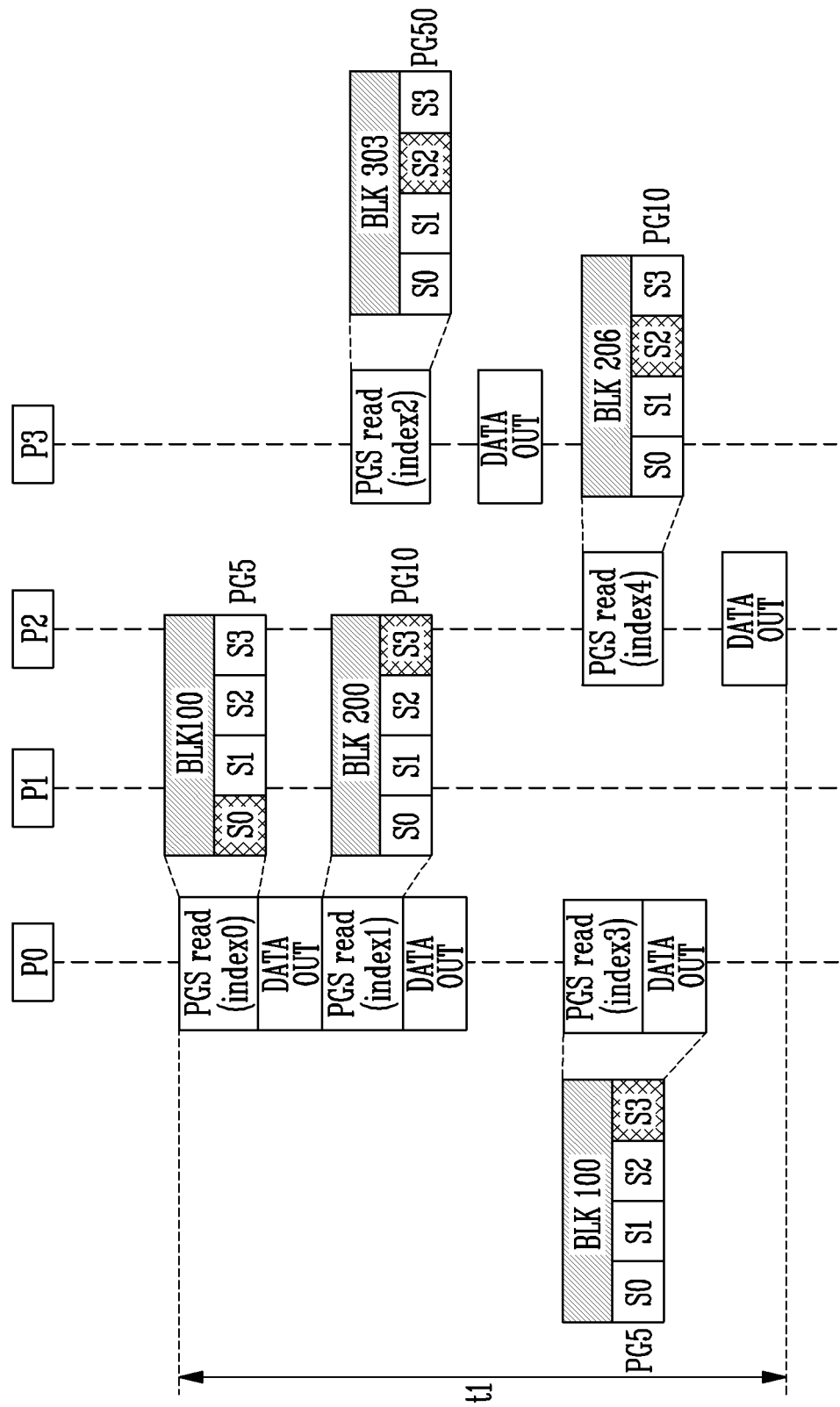
FIG. 9 illustrates an embodiment of a read operation.

FIG. 9 is a diagram exemplarily illustrating an embodiment of a read operation. Referring to FIGS. 8 and 9, the physical address and the read command RCMD1, which are stored in the index number 0 Index0 of the first read command queue 221, may be provided to the memory device 100. The memory device 100 may perform a read operation RGS read on a sub-page corresponding to the physical address including the plane number 0 PO, the block number 100 BLK10, the page number 5 PG5, and the sub-page number 0 S0 in response to the read command RCMD1. Data stored in the sub-page may be output by the read operation PGS read (DATA OUT).

Next, the read command RCMD2 and the physical address, which are stored in the index number 1 Index1 of the first read command queue 221, may be provided to the memory device 100. The memory device 100 may perform a read operation PGS read on a sub-page corresponding to the physical address including the plane number 0 PO, the block number 200 BLK200, the page number 10 PG10, and the sub-page number 3 S3 in response to the read command RCMD2. Data stored in the sub-page may be output by the read operation PGS read (DATA OUT).

After the read command RCMD2 stored in the index number 1 Index1 of the first read command queue 221 is provided to the memory device 100, the read command RCMD3 and the physical address (which are stored in the index number 2 Index2 of the first read command queue 221) may be provided to the memory device 100. The memory device 100 may perform a read operation PGS read on a sub-page corresponding to the physical address including the plane number 3 P3, the block number 303 BLK303, the page number 50 PG50, and the sub-page number 2 S2 in response to the read command RCMD3.

Since a plane number of the physical address stored in the index number 1 Index 1 of the first read command queue 221 and a plane number of the physical address stored in the index number 2 Index 2 of the first read command queue 221 are different from each other, the memory device 100 may perform a read operation on the zeroth plane 101 having the plane number 0 PO and the third plane 104 having the plane number 3 P3, for example, using the plane interleaving scheme. For example, a read operation PGS read on the zeroth plane 101 and a read operation PGS read on the third plane 104 may partially overlap with each other.

Data may be output by the read operation PGS read performed on the third plane 104 having the plane number 3 P3 (DATA OUT). The data output by the read operation PGS performed on the third plane 104 is output after data output by the read operation PGS read performed by the zeroth plane 101 is provided to the memory controller 200 (DATA OUT). The reason is that a plurality of planes (e.g., planes 101 to 104 of FIG. 1 or planes PLANE0, PLANE1, PLANE2, and PLANE3 of FIG. 2) are connected to one channel.

Next, the read command RCMD4 and the physical address, which are stored in the index number 3 Index3 of the first read command queue 221, may be provided to the memory device 100. The memory device 100 may perform a read operation PGS read on a sub-page corresponding to the physical address including the plane number 0 P03, the block number 100 BLK100, the page number 5 PG5, and the sub-page number 3 S3 in response to the read command RCMD4. Data stored in the sub-page may be output by the read operation PGS read (DATA OUT).

After the read command RCMD4 stored in the index number 3 Index3 of the first read command queue 221 is provided to the memory device 100, the read command RCMD5 and the physical address (which are stored in the index number 4 Index4 of the first read command queue 221) may be provided to the memory device 100. The memory device 100 may perform a read operation PGS read on a sub-page corresponding to the physical address including the plane number 2 P2, the bock number 206 BLK206, the page number 10 PG10, and the sub-page number 2 S2 in response to the read command RCMD5.

Since the plane numbers of the physical addresses stored in the index numbers 3 and 4 Index3 and Index4 of the first read command queue 221 are different from each other, the memory device 100 may perform a read operation on the zeroth plane 101 and the second plane 103 using the plane interleaving scheme. For example, a read operation PGS read on the zeroth plane 101 and a read operation PGS read on the second plane 103 may partially overlap with each other. Data may be output by the read operation performed on the second plane 103 (DATA OUT). The data output by the read operation PGS read performed on the second plane 103 is output after data output by the read operation PGS read performed on the zeroth plane 101 is provided to the memory controller 200 (DATA OUT). The reason is that a plurality of planes (e.g., planes 101 to 104 of FIG. 1 or planes PLANE0, PLANE1, PLANE2, and PLANE3 of FIG. 2) are connected to one channel.

There may be a first time t1 to complete a read operation on the read commands RCMD1, RCMD2, RCMD3, RCMD4, and RCMD5 stored in the respective index numbers of the first read command queue 221. When there exist physical addresses to be simultaneously provided to the memory device 100 (among the physical addresses stored in the index number 0 to 4 Index 0 to Index 4 of the first read command queue 221) or physical addresses to be read using the plane interleaving scheme (among the physical addresses stored in the index number 0 to 4 Index 0 to Index 4 of the first read command queue 221), a time to complete a read operation may be shorter than the first time t1.

FIG. 10 is a diagram illustrating an embodiment of scheduling read commands and physical addresses, which are stored in a first read command queue, in a second read command queue.

Referring to FIG. 10, in an embodiment, the command schedule controller 230 may search for a first physical address group including physical addresses having the same page number among the physical addresses stored in the first read command queue 221. In an embodiment, the first physical address group may include physical addresses having the same plane number, the same block number, and the same page number.

For example, since the physical addresses stored in the index numbers 0 and 3 Index0 and Index3 of the first read command queue 221 include the plane number 0 P0, the block number 100 BLK100, and the page number 5 PG5, the physical addresses stored in the index numbers 0 and 3 Index0 and Index3 of the first read command queue 221 may be searched as the first physical address group.

The command schedule controller 230 may schedule a read command corresponding to the first physical address group and the first physical address group in any one index number (e.g., the index number 0 (Index0) among index numbers Index0, Index1, Index2, Index3, Index4, Index5, Index6, and Index7 of the second read command queue 222. The number of read commands RCMD1 stored in the index number 0 Index0 of the second read command queue 222 may be 1 which is equal to that of plane numbers of the first physical address group.

In an embodiment, the first physical address group may include physical addresses having different plane numbers and the same page number. For example, the physical address stored in the index number 1 Index1 of the first read command queue 221 includes the plane number 0 P0, the block number 200 BLK200, the page number 10 PG10, and the sub-page number 3 S3, and the physical address stored in the index number 4 Index4 of the first read command queue 221 includes the plane number 2 P2, the block number 206 BLK206, the page number 10 PG10, and the sub-page number 2 S2.

Since the physical addresses stored in the index numbers 1 and 4 Index1 and Index4 of the first read command queue 221 are physical addresses including different plane numbers and the same page number, the physical addresses stored in the index numbers 1 and 4 Index1 and Index4 of the first read command queue 221 may be searched as the first physical address group.

The command schedule controller 230 may schedule a read command corresponding to the first physical address group and the first physical address group in any one index number (e.g., the index number 0 (Index0) among index numbers Index0, Index1, Index2, Index3, Index4, Index5, Index6, and Index7 of the second read command queue 222. The number of read commands RCMD3 stored in the index number 2 Index2 of the second read command queue 222 may be 2 which is equal to that of plane numbers of the first physical address group.

The command schedule controller 230 may search for a second physical address group among the physical addresses stored in the first read command queue 221. For example, when the physical addresses stored in the index numbers 1 and 4 Index1 and Index4 of the first read command queue 221 are in the first physical address group, the physical address stored in the index number 2 Index2 of the first read command queue 221 may be in the second physical address group.

The command schedule controller 230 may sequentially schedule the first physical address group and the second physical address group in consecutive index numbers of the second read command queue 222. For example, the command schedule controller 230 may schedule the physical addresses stored in the index numbers 0 and 3 Index0 and Index3 of the first read command queue 221 in the index number 0 Index0. Also, the command schedule controller 230 may schedule the physical address including the plane number 3 P3, the block number 303 BLK303, the page number 50 PG50, and the sub-page number 2 S2 in the index number 1 Index1 of the second read command queue 222. The command schedule controller 230 may schedule the physical addresses stored in the index numbers 1 and 4 Index1 and Index4 of the first read command queue 221 in the index number 2 Index2 of the second read command queue 222.

Figure 11:
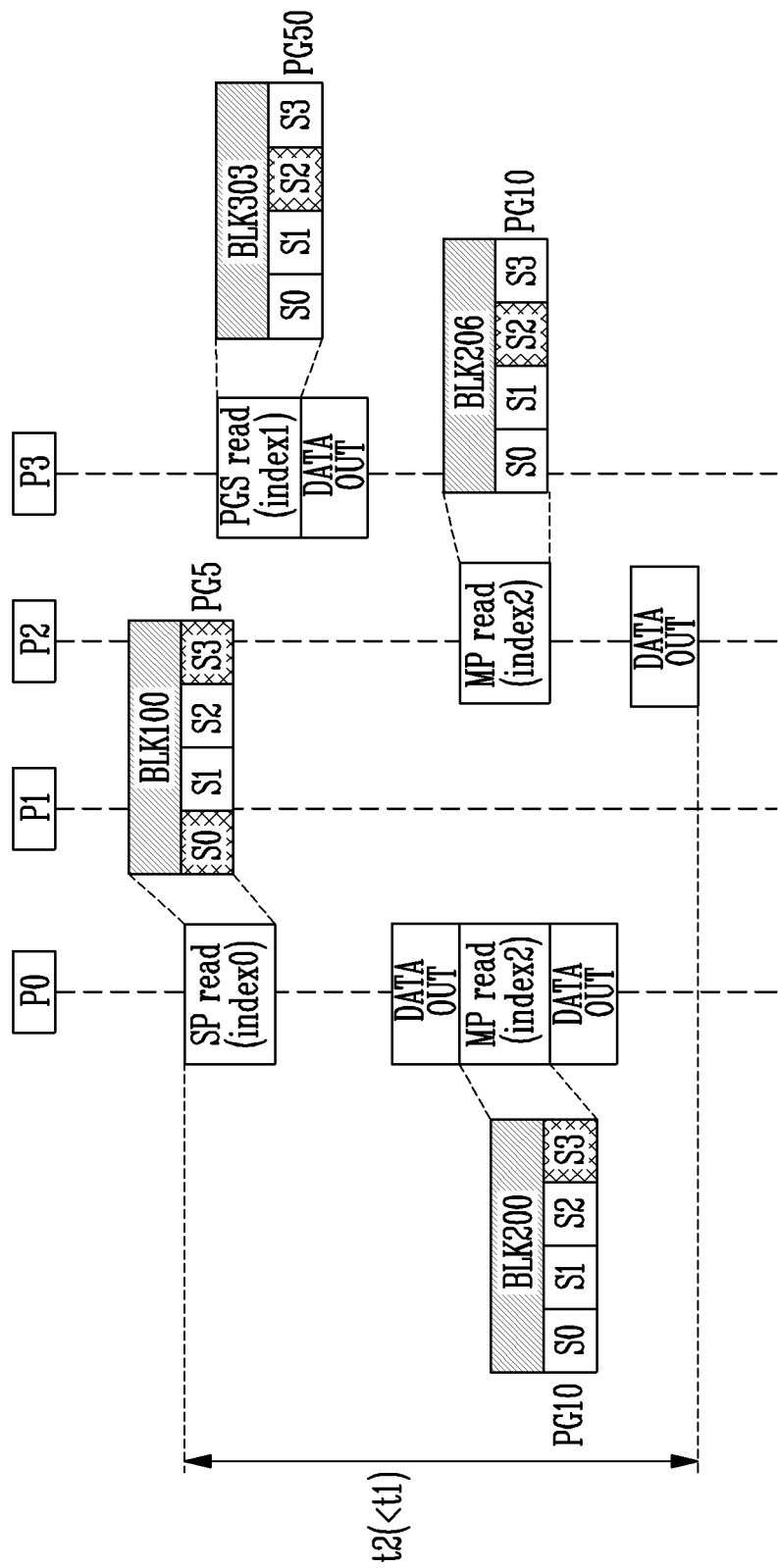
FIG. 11 illustrates an embodiment of a read operation.

FIG. 11 is a diagram exemplarily illustrating an embodiment of a read operation performed in accordance with the embodiment of FIG. 10.

Referring to FIGS. 10 and 11, the read command RCMD1 and the physical addresses, which are stored in the index number 0 Index0 of the second read command queue 222, may be provided to the memory device 100. The memory device 100 may perform a read operation on a page of a single plane (e.g., the zeroth plane 101) having the physical addresses stored in the index number 0 Index0 of the second read command queue 222 in response to the read command RCMD1. The read operation performed on the page of the single plane may be correspond to a single plane read operation SP read.

Next, the read command RCMD2 and the physical addresses, which are stored in the index number 1 Index1 of the second read command queue 222, may be provided to the memory device 100. The memory device 100 may perform a read operation PGS read on a sub-page corresponding to the physical address stored in the index number 1 Index1 of the second read command queue 222 in response to the read command RCMD2.

The memory device 100 may perform a read operation on the zeroth plane 101 having the plane number 0 P0 and the third plane 104 having the plane number 3 P3 using the plane interleaving scheme.

Data may be output by a read operation PGS read performed on the third plane 104 (DATA OUT). Next, data is output by a single plane read operation SP read performed by the zeroth plant 101 (DATA OUT). The reason is that a plurality of planes (e.g., the planes 101 to 104 shown in FIG. 1 or the planes PLANE0, PLANE1, PLANE2, and PLANE3 shown in FIG. 2) are connected to one channel, and a speed of the read operation PGS read is faster than that of the single plane read operation SP read.

Next, the read command RCMD3 and the physical addresses, which are stored in the index number 2 Index2 of the second read command queue 222, may be provided to the memory device 100. The memory device 100 may simultaneously perform a read operation on pages of respective planes having the physical addresses stored in the index number 0 Index0 of the second read command queue 222 in response to the read command RCMD3. The read operation simultaneously performed on the pages of the respective planes may be defined as a multi-plane read operation MP read.

Data may be output by a multi-plane read operation MP read performed on the zeroth plane 101 (DATA OUT). Next, data may be output by a multi-plane read operation MP read on the second plane 103 (DATA OUT).

There may be second time t2 to complete a read operation on the read commands RCMD1, RCMD2, and RCMD3 stored in respective index numbers of the second read command queue 222. The second time t2 may be shorter than the first time t1 described above with reference to FIG. 9.

As described above, since a read command queue is realigned, the number of sensing operations used to perform a read operation on a read request of the host 400 can be decreased, and a phenomenon in which a response to the read request of the host 400 is delayed can be prevented. As a result, performance of the read operation can be increased.

FIG. 12 is a diagram illustrating an embodiment of scheduling the read commands and the physical addresses, which are stored in the first read command queue, in the second read command queue.

Referring to FIG. 12, the command schedule controller 230 may schedule a first physical address group (including physical addresses having all the same plane number, the same block number, and the same page number among the physical addresses stored in the first read command queue 221) in any one index number among the index numbers of the second read command queue 222. For example, the command schedule controller 230 may schedule the physical addresses stored in the index numbers 0 and 3 Index0 and Index3 of the first read command queue 221 in the index number 0 Index0 of the second read command queue 222.

The command schedule controller 230 may schedule a read command corresponding to the first physical address group in the index number 0 Index0 of the second read command queue 222. The number of read commands stored in the index number 0 Index0 of the second read command queue 222 may be 1.

The command schedule controller 230 may search for a second physical address group among the physical addresses stored in the first read command queue 221. For example, the first physical address group (including the physical addresses having all the same plane number, the same block number, and the same page number) may include the physical addresses stored in the index numbers 0 and 3 Index0 and Index3 of the first read command queue 221. The second physical address group may include the physical addresses stored in the index numbers 2 and 4 Index2 and Index4 of the first read command queue 221.

The command schedule controller 230 may sequentially schedule the first physical address group and the second physical address group in consecutive index numbers of the second read command queue 222. For example, it is assumed that the first physical address group is scheduled in the index number 0 Index0 of the second read command queue 222, and the second physical address group includes the physical addresses stored in the index numbers 2 and 4 Index2 and Index4 of the first read command queue 221. The physical address stored in the index number 2 Index of the first read command queue 221 may be scheduled in the index number 2 Index2 of the second read command queue 222, and the physical address stored in the index number 4 Index4 of the first read command queue 221 may be scheduled in the index number 1 Index1 of the second read command queue 222.

The command schedule controller 230 may sequentially schedule read commands in the index numbers 1 and 2 Index1 and Index2 of the second read command queue 222. The physical address stored in the index number 1 Index1 of the first read command queue 221 may be scheduled in the index number 3 Index3 of the second read command queue 222. The command schedule controller 230 may schedule a read command in the index number 3 Index3 of the second read command queue 222.

Figure 13:
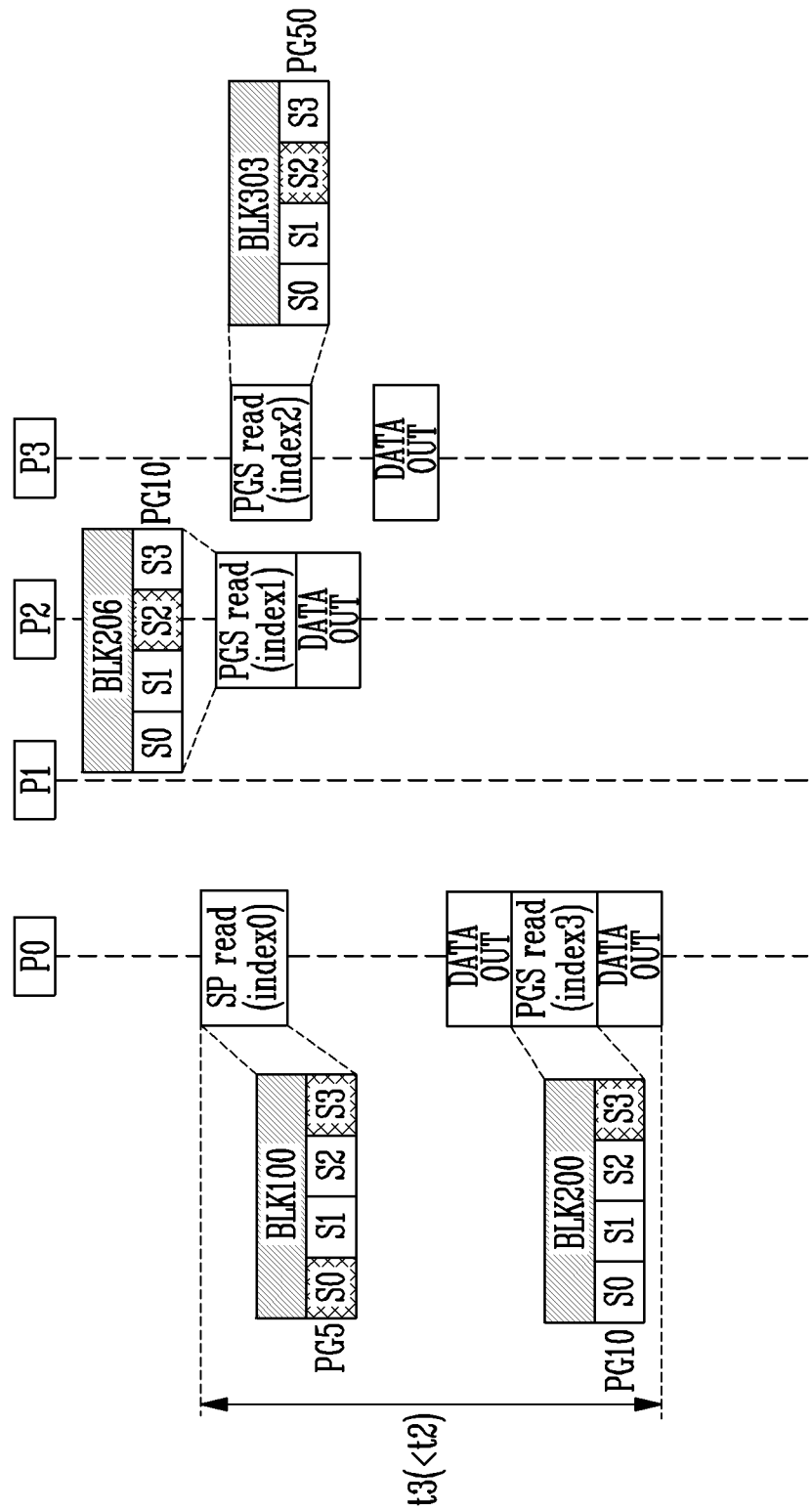
FIG. 13 illustrates an embodiment of a read operation.

FIG. 13 is a diagram exemplarily illustrating an embodiment of a read operation performed in accordance with the embodiment of FIG. 12.

Referring to FIGS. 12 and 13, the read command RCMD1 and the physical address, which are stored in the index number 0 Index0 of the second read command queue 222, may be provided to the memory device 100. The memory device 100 may perform a single plane read operation SP read.

Next, the read command RCMD2 and the physical address, which are stored in the index number 1 Index1 of the second read command queue 222 may be provided to the memory device 100. The memory device 100 may perform a read operation PGS read.

A single plane read operation SP read on the zeroth plane 101 having the plane number 0 PO, a read operation PGS read on the second plane 103 having the plane number 2 P2, and a read operation PGS read on the third plane 104 having the plane number 3 P3 may be performed using the plane interleaving scheme.

A sequence in which data are output may be a sequence in which the read operation PGS read is performed on the second plane 103, the read operation on the third plane 104, and the single plane read operation SP read on the zeroth plane 101. This is because the speed of the read operation PGS read may be faster than that of the single plane read operation SP read.

Next, the read command RCMD4 and the physical address, which are stored in the index number 3 Index3 of the second read command queue 222, may be provided to the memory device 100. The memory device 100 performs a read operation PGS read, and data is output (DATA OUT).

A third time t3 may exist to complete a read operation on the read commands RCMD1, RCMD2, and RCMD3 stored in respective index numbers of the second read command queue 222. The third time t3 may be shorter than the second time t2 described with reference to FIG. 11.

As described above, a read command and a physical address, which are stored in the first read command queue 221, are realigned in the second read command queue 222, so that a response time to the read request can be decreased and read performance can be increased.

FIG. 14 is a diagram illustrating an embodiment of the command storage 220, which may include a first read command queue 221 and a second read command queue 222. Like in FIG. 8, the first read command queue 221 may sequentially store a read command RCMD and a physical address Physical Address. However, unlike as shown in FIG. 8, physical addresses including different page numbers may be stored in the first read command queue 221. A first physical address group among the physical addresses stored in the first read command queue 221 may not be searched.

In an embodiment, physical addresses on which a read operation can be performed using the plane interleaving scheme may be stored in the first read command queue 221. For example, physical addresses stored in index numbers 1 and 2 Index1 and Index2 of the first read command queue 221 are physical addresses on which a read operation can be performed by using the plane interleaving scheme. For example, physical addresses stored in index numbers 4 to 6 Index4 to Index6 of the first read command queue 221 are physical addresses on which a read operation can be performed using the plane interleaving scheme. In one embodiment, the second read command queue 222 may correspond to the second read command queue 222 shown in FIG. 8.

Figure 15:
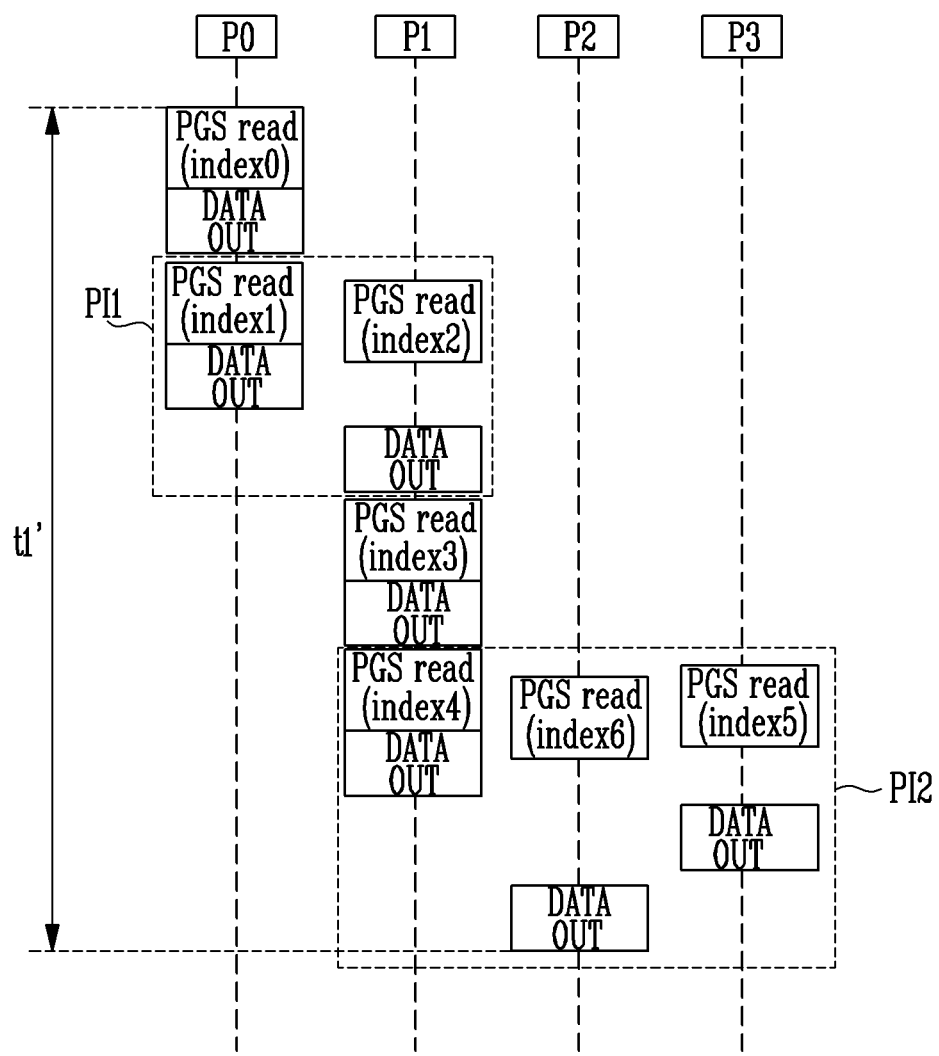
FIG. 15 illustrates an embodiment of a read operation.

FIG. 15 is a diagram illustrating an embodiment of a read operation performed in accordance with the embodiment of FIG. 14.

Referring to FIGS. 14 and 15, a read command RCMD1 and a physical address, which are stored in an index number 0 Index0 of the first read command queue 221, may be provided to the memory device 100. The memory device 100 may perform a read operation PGS, and data stored in a page may be output (DATA OUT).

Next, a read command RCMD2 and a physical address, which are stored in the index number 1 Index1 of the first read command queue 221, may be provided to the memory device 100. The memory device 100 may perform a read operation PGS, and data stored in a page may be output (DATA OUT).

After the read command RCMD2 stored in the index number 1 Index1 of the first read command queue 221 is provided to the memory device 100, a read command RCMD3 and a physical address, which are stored in the index number 2 Index2 of the first read command queue 221, may be provided to the memory device 100. The memory device may perform a read operation PGS read, and data stored in a page may be output (DATA OUT).

The read operation PGS read instructed by the read command RCMD2 stored in the index number 1 Index1 of the first read command 221 and the read operation PGS read instructed by the read command RCMD3 stored in the index number 2 Index2 of the first read command queue 221 may be performed using a first plane interleaving scheme P11.

Next, a read command RCMD4 and a physical address, which are stored in an index number 3 Index3 of the first read command queue 221, may be provided to the memory device 100. The memory device 100 may perform a read operation PGS read, and data stored in a page may be output (DATA OUT).

Next, a read command RCMD5 and a physical address, which are stored in the index number 4 Index4 of the first read command queue 221, may be provided to the memory device 100. The memory device 100 may perform a read operation PGS read, and data stored in a page may be output (DATA OUT).

After the read command RCMD5 stored in the index number 4 Index4 of the first read command queue 221 is provided to the memory device 100, a read command RCMD6 and a physical address, which are stored in the index number 5 Index5 of the first read command queue 221, may be provided to the memory device 100. The memory device 100 may perform a read operation PGS read, and data stored in a page may be output (DATA OUT).

After the read command RCMD6 stored in the index number 5 Index5 of the first read command 221 is provided to the memory device 100, a read command RCMD7 and a physical address, which are stored in the index number 6 Index6 of the first read command queue 221, may be provided to the memory device 100. The memory device 100 may perform a read operation PGS read, and data stored in a page may be output (DATA OUT).

The read operation PGS read instructed by the read command RCMD5 stored in the index number 4 Index4 of the first read command queue 221, the read operation PGS read instructed by the read command RCMD6 stored in the index number 5 Index5 of the first read command queue 221, and the read operation PGS read instructed by the read command RCMD7 stored in the index number 6 Index6 of the first read command queue 221 may be performed by using a second plane interleaving scheme P12.

A first time t1' may be required to complete a read operation on the read command RCMD1 stored in the index number 0 Index0 of the first read command queue 221 to the read command RCMD7 stored in the index number 6 Index6 of the first read command queue 221. When the physical addresses and the read commands, which are stored in the first read command queue 221, are again scheduled in the second read command queue 222, such that the number of planes operated using the plane interleaving scheme becomes largest, a time to complete a read operation may be shorter than the first time t1'.

FIG. 16 is a diagram illustrating an embodiment of scheduling the read commands and the physical addresses, which are stored in the first read command queue, in the second read command queue.

Referring to FIG. 16, when the first physical address group is not searched, the command schedule controller 230 may search for a plane interleaving group including all physical addresses having different plane numbers among the physical addresses stored in the first read command queue 221. For example, the physical addresses stored in the index numbers 0, 2, 5, and 6 Index0, Index2, Index5, and Index6 of the first read command queue 221 may be included in the plane interleaving group.

The command schedule controller 230 may sequentially schedule the physical addresses in the plane interleaving group in consecutive index numbers of the second read command queue 222. Also, the command schedule controller 230 may sequentially schedule a read command corresponding to each of the physical addresses in the plane interleaving group in consecutive index numbers of second read command queue 222.

In an embodiment, the command schedule controller 230 may sequentially schedule the physical addresses in the plane interleaving group in index numbers from an index number corresponding to a first priority output sequence of the second read command queue 222. Also, the command schedule controller 230 may sequentially schedule a read command corresponding to each of the physical addresses in the plane interleaving group in the index numbers from the index number corresponding to the first priority output sequence of the second read command queue 222. For example, the physical addresses stored in the index numbers 0, 2, 5, and 6 Index0, Index2, Index5, and Index6 of the first read command 221 may be sequentially scheduled in the index number 0 to 3 Index0 to Index3 of the second read command queue 222. In addition, the read commands RCMD1, RCMD2, RCMD3, and RCMD4 may be sequentially scheduled in the index number 0 to 3 Index0 to Index3 of the second read command queue 222.

The command schedule controller 230 may search for an additional plane interleaving group using the other physical addresses, except the plane interleaving group, among the physical addresses stored in the first read command queue 221. For example, the physical addresses stored in the index numbers 2 and 3 Index2 and Index3 of the first read command queue 221 may be in another plane interleaving group. The physical addresses in the another plane interleaving group may be sequentially scheduled in consecutive index numbers of the second read command queue 222 to be output next to the plane interleaving group. For example, the physical addresses stored in the index numbers 2 and 3 Index2 and Index3 of the first read command queue 221 may be sequentially scheduled in the index numbers 4 and 5 Index4 and Index5 of the second read command queue 222. The physical address stored in the index number 4 Index4 of the first read command queue 221 may be scheduled in the index number 6 Index6 of the second read command queue 222.

Figure 17:
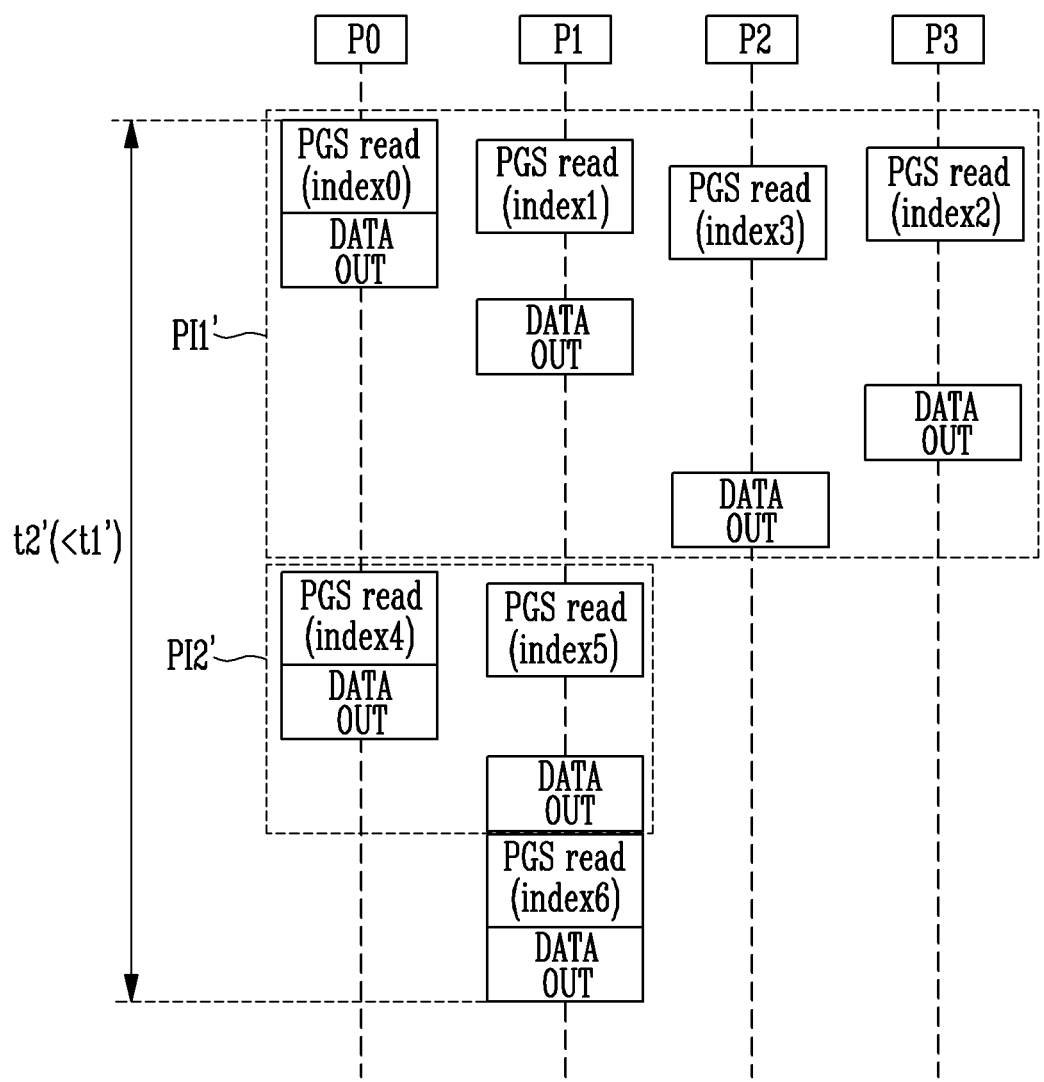
FIG. 17 illustrates an embodiment of a read operation.

FIG. 17 is a diagram illustrating an embodiment of a read operation performed in accordance with the embodiment shown in FIG. 16.

Referring to FIGS. 16 and 17, the memory device 100 may perform a read operation in response to a physical address and a read command, which are stored in an index number of the second read command queue 222. For example, the read operation PGS read instructed by the read command RCMD1 stored in the index number 0 Index0 of the second read command queue 222, a read operation PGS read instructed by the read command RCMD2 stored in the index number 1 Index1 of the second read command queue 222, the read operation PGS read instructed by the read command RCMD3 stored in the index number 2 Index2 of the second read command queue 222, and the read operation PGS read instructed by the read command RCMD4 stored in the index number 3 Index3 of the second read command queue 222 may be performed by using a first plane interleaving scheme P11'. Data stored in the respective planes may be sequentially output (DATA OUT).

For example, the read operation PGS read instructed by the read command RCMD5 stored in the index number 4 Index4 of the second read command queue 222 and the read operation PGS read instructed by the read command RCMD6 stored in the index number 5 Index5 of the second read command queue 222 may be performed by using a second plane interleaving scheme P12'. Data stored in the respective planes may be sequentially output (DATA OUT).

A second time t2 may be required to complete a read operation on the read commands RCMD1, RCMD2, RCMD3, RCMD4, RCMD5, RCMD6, and RCMD7 stored in the respective index numbers of the second read command queue 222. The second time t2 may be shorter than the first time t1' described with reference to FIG. 15.

As described above, a read command queue is realigned such that the number of planes operated using the plane interleaving scheme becomes largest. Thus, a response time to the read request can be decreased and read performance can be increased. Also, as described above, since a read command queue is realigned, the number of times all sensing operations are performed for a read operation on a read request of the host 400 can be decreased, a phenomenon in which a response to the read request of the host 400 is delayed can be prevented, and the performance of the read operation can be increased.

Figure 18:
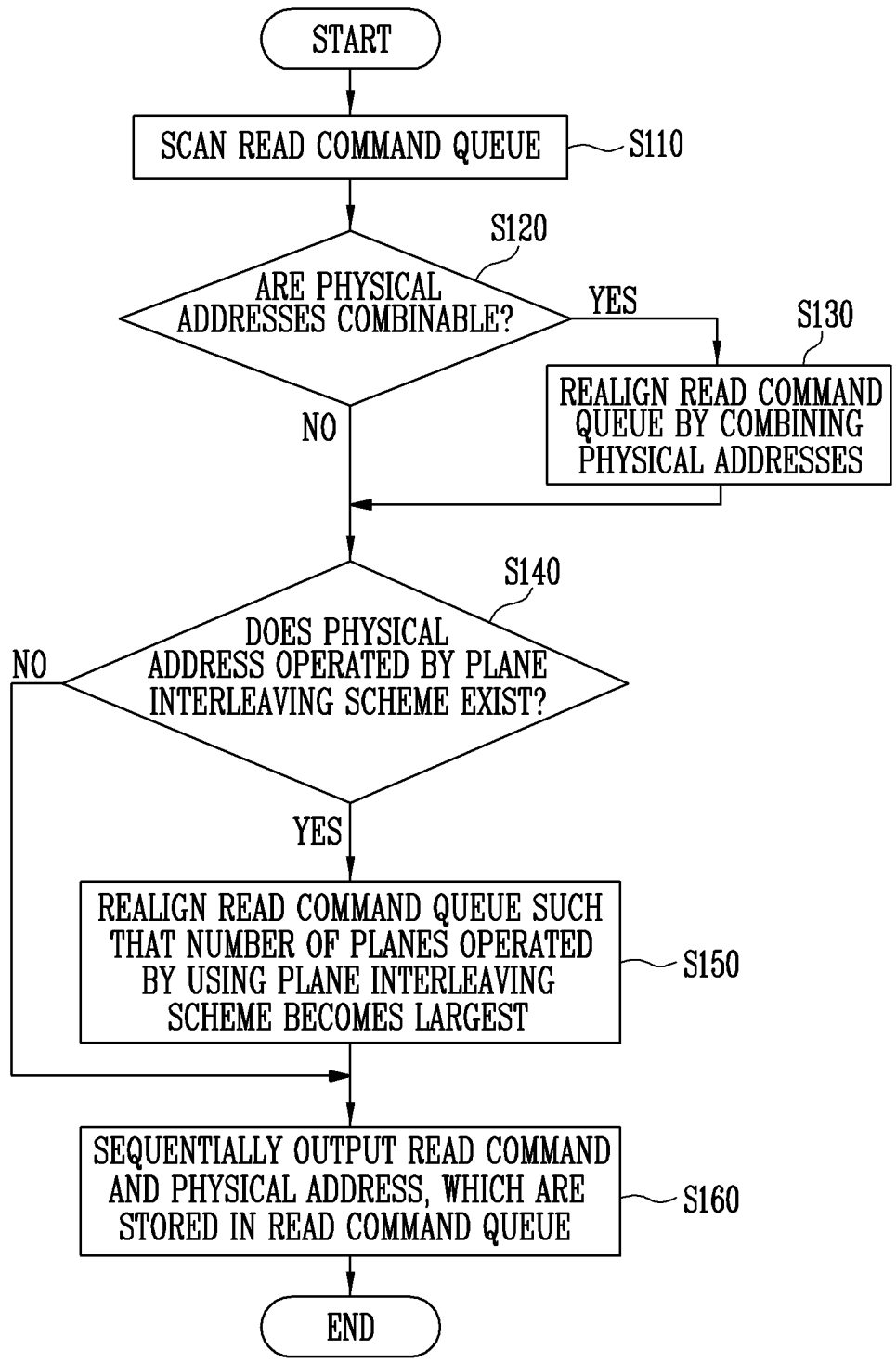
FIG. 18 illustrates an embodiment of a method of operating a memory controller.

FIG. 18 is a diagram illustrating an embodiment of a method of operating a memory controller, which, for example, may be memory controller 200.

Referring to FIG. 18, the method includes, at S110, the memory controller 200 scanning a read command queue. For example, the memory controller 200 may scan physical addresses stored in the read command queue and may compare plane numbers, block numbers, and page numbers of the physical addresses with each other.

At S120, the memory controller 200 determines whether at least two physical addresses among the physical addresses stored in the read command queue are combinable. As described above, whether the physical addresses are combinable may be based on determining whether plane numbers of the physical addresses are different from each other and page numbers of the physical addresses are the same or determining whether the physical addresses all have the same plane number, the same block number, and the same page number.

At S130, when the physical addresses are combinable (S120, YES), the memory controller 200 realigns the read command queue by combining the physical addresses. As described above, realigning the read command queue by combining the physical addresses may correspond to scheduling the translated physical address in an index number of the physical address pre-stored in the read command queue, such that a multi-plane read operation MP read or a single plane read operation SP read can be performed.

At S140, when the physical addresses are not combinable (S120, NO), the memory controller 200 determines whether there exists a physical address operated using the plane interleaving scheme, among the physical addresses stored in the read command queue.

At S150, when the physical address operated using the plane interleaving scheme exists (S140, YES), the memory controller 200 realigns the read command queue such that the number of planes operated using the plane interleaving scheme becomes largest. This operation may be performed as previously described.

At S160, the memory controller 200 sequentially outputs the read command and the physical address, which are stored in the read command queue, according to a scheduled sequence. When the physical address operated using the plane interleaving scheme does not exist (S140, NO), operation S160 may be performed.

Figure 19:
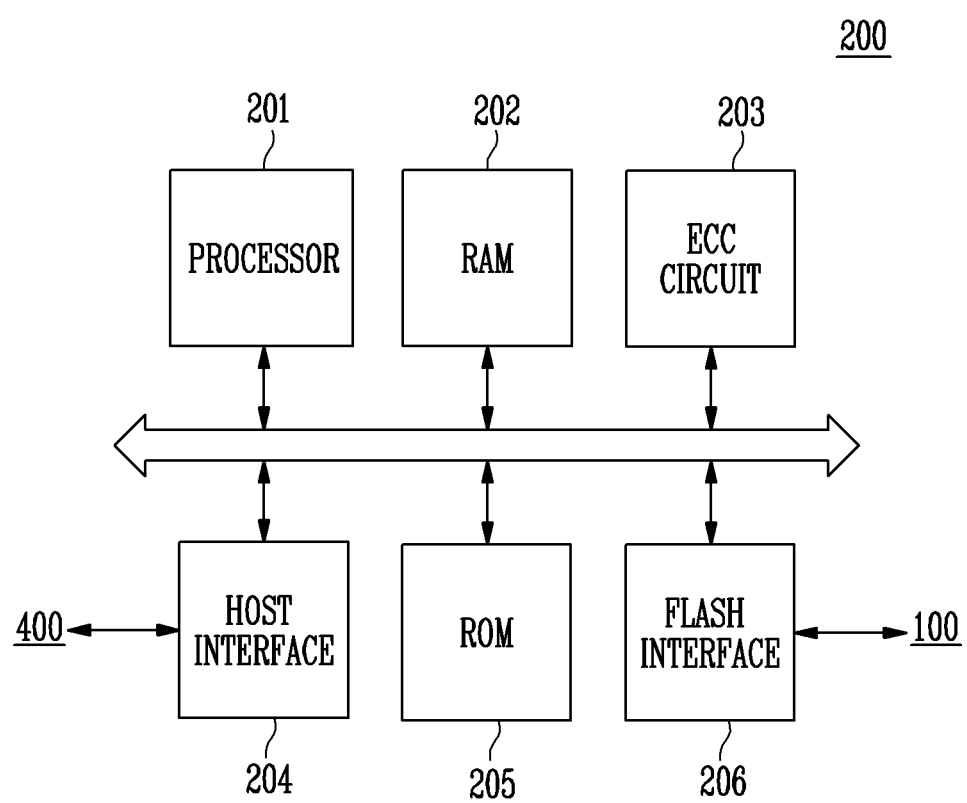
FIG. 19 illustrates an embodiment of a memory controller.

FIG. 19 is a diagram illustrating an embodiment of the memory controller 200, which may include a processor 201, a RAM 202, an error correction code (ECC) circuit 203, a host interface 204, a ROM 205, and a flash interface 206.

The processor 201 may control overall operation of the memory controller 200.

The RAM 202 may be used as a buffer memory, a cache memory, a working memory, etc. of the memory controller 200. Exemplarily, the RAM 202 may be a buffer memory.

The ECC circuit 203 may generate an ECC for correcting a fail bit or error bit of data received from the memory device 100. The ECC circuit 203 may generate data to which a parity bit is added by performing ECC encoding of data provided to the memory device 100. The parity bit may be stored in the memory device 100.

The ECC circuit 203 may perform ECC decoding on data output from the memory device 100. The ECC circuit 203 may correct an error by using a parity. For example, the ECC circuit 203 may correct an error by using various coded modulations such as an LDPC code, a BCH code, a turbo code, a Reed-Solomon code, a convolution code, an RSC, a TCM, and a BCM.

The ECC circuit 203 may calculate an ECC value of data to be programmed to the memory device 100 in a program operation. The ECC circuit 203 may perform an error correction operation on data read from the memory device 100 in a read operation, based on the ECC value. The ECC circuit 203 may perform an error correction operation of data recovered from the memory device 100 in a recovery operation of data which fails.

The memory controller 200 may communicate with an external device (e.g., the host 400, an application processor, or the like) through the host interface 204.

The ROM 205 may store, in the form of firmware or other types of instructions, various information to control operations of the memory controller 200.

The memory controller 200 may communicate with the memory device 100 through the flash interface 206. The memory controller 200 may transmit a command CMD, an address ADDR, a control signal CTRL, and the like to the memory device 100 through the flash interface 206, and receive data DATA. The flash interface 206 may include, for example, a NAND interface.

Figure 20:
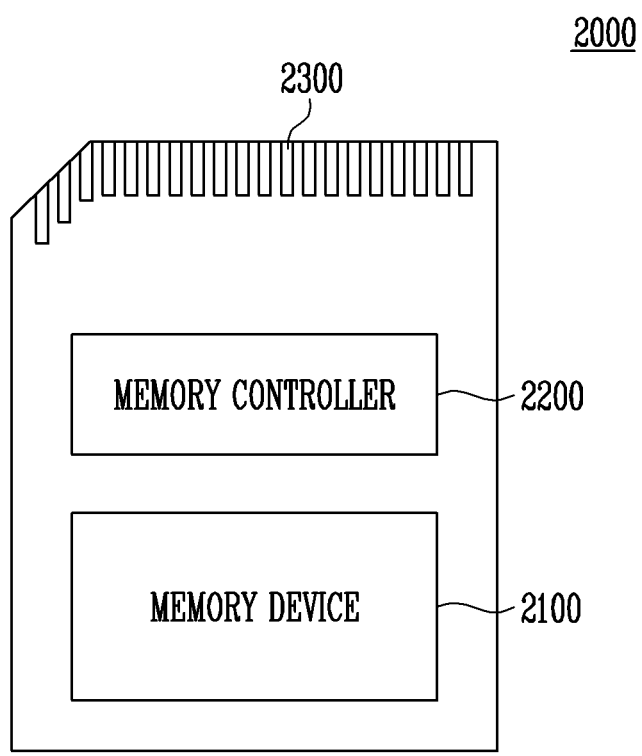
FIG. 20 illustrates an embodiment of a memory card system.

FIG. 20 is a block diagram illustrating an embodiment of a memory card system 2000, to which a storage device in accordance with any of the embodiments described herein may be applied.

Referring to FIG. 20, the memory card system 2000 includes a memory device 2100, a memory controller 2200, and a connector 2300. The memory device 2100 may be implemented, for example, with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The memory controller 2200 is connected to access the memory device 2100. The memory controller 2200 may control read, write, erase, and background operations of the memory device 2100. The memory controller 2200 serve as an interface between the memory device 2100 and a Host. The memory controller 2200 drives firmware or other instructions to control the memory device 2100. The memory controller 2200 may be implemented in a manner similar to the memory controller 200 of FIG. 1.

In addition, the memory controller 2200 may include components such as a Random Access Memory (RAM), a processing unit, a host interface, a memory interface, and an error corrector. The memory controller 2200 may communicate with an external device through the connector 2300. The memory controller 2200 may communicate with the external device (e.g., host 400) according to a specific communication protocol. Examples of the communication protocols include a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe. Exemplarily, the connector 2300 may be defined by at least one of the above-described various communication protocols.

The memory device 2100 and the memory controller 2200 may be integrated into a single semiconductor device, to constitute a memory card. Examples of the memory card include a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 21:
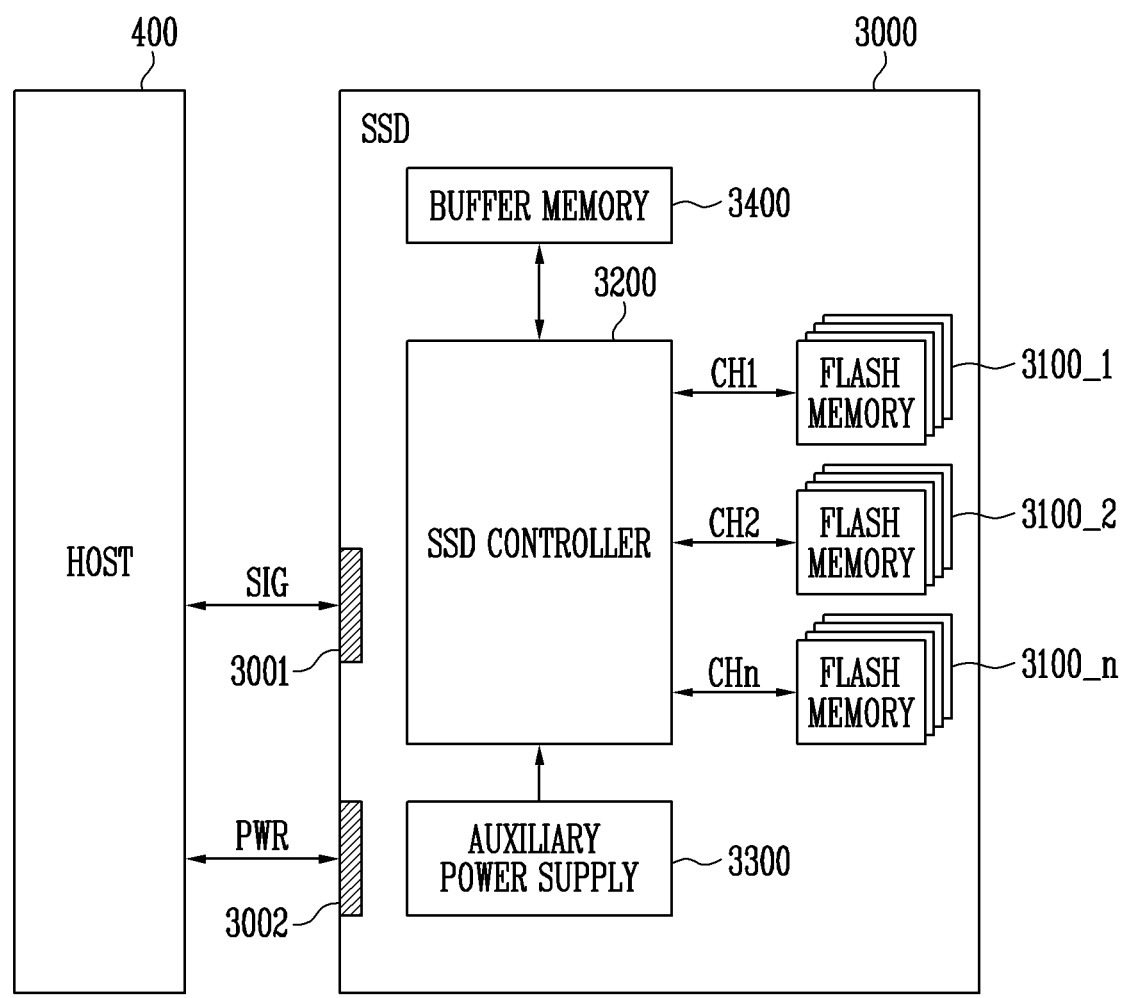
FIG. 21 illustrates an embodiment of a Solid State Drive system.

FIG. 21 is a block diagram illustrating an embodiment of a Solid State Drive (SSD) system 3000, to which a storage device in accordance with the embodiments described herein may be applied.

Referring to FIG. 21, the SSD system 3000 includes a host 400 and an SSD 3000. In one embodiment, the SSD 3000 may exchange signals SIG with the host 400 through a signal connector 3001, and may receive power PWR through a power connector 3002. The SSD 3200 includes an SSD controller 3200, a plurality of flash memories 3100_1, 3100_2, and 3100_n, an auxiliary power supply 3300, and a buffer memory 3400. In accordance with an embodiment, the SSD controller 3200 may perform the same functions as memory controller 200 of FIG. 1.

The SSD controller 3200 may control the plurality of flash memories 3100_1, 3100_2, and 3100_n in response to signal SIG from the host 400. Exemplarily, the signal SIG may be a signal based on an interface between the host 400 and the SSD 3000. For example, the signal SIG may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 3300 is connected to the host 400 through the power connector 3002. The auxiliary power device 3300 may receive the power PWR input from the host 400, and charge the power PWR. When the supply of power from the host 400 is not smooth (or does not otherwise conform to a predetermined level or pattern), the auxiliary power supply 3300 may provide power of the SSD 3000. For example, the auxiliary power supply 3300 may be located in the SSD 3000 or may be located outside of and coupled to the SSD 3000. In one embodiment, the auxiliary power supply 3300 may be on a main board and/or may provide auxiliary power to the SSD 3000.

The buffer memory 3400 may temporarily store data, for example, from the host 400 and/or data received from flash memories 3100_1, 3100_2, and 3100_n. In one embodiment, buffer memory 3400 may temporarily store meta data (e.g., a mapping table) of the flash memories 31001, 31002, and 3100_n. The buffer memory 3400 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 22:
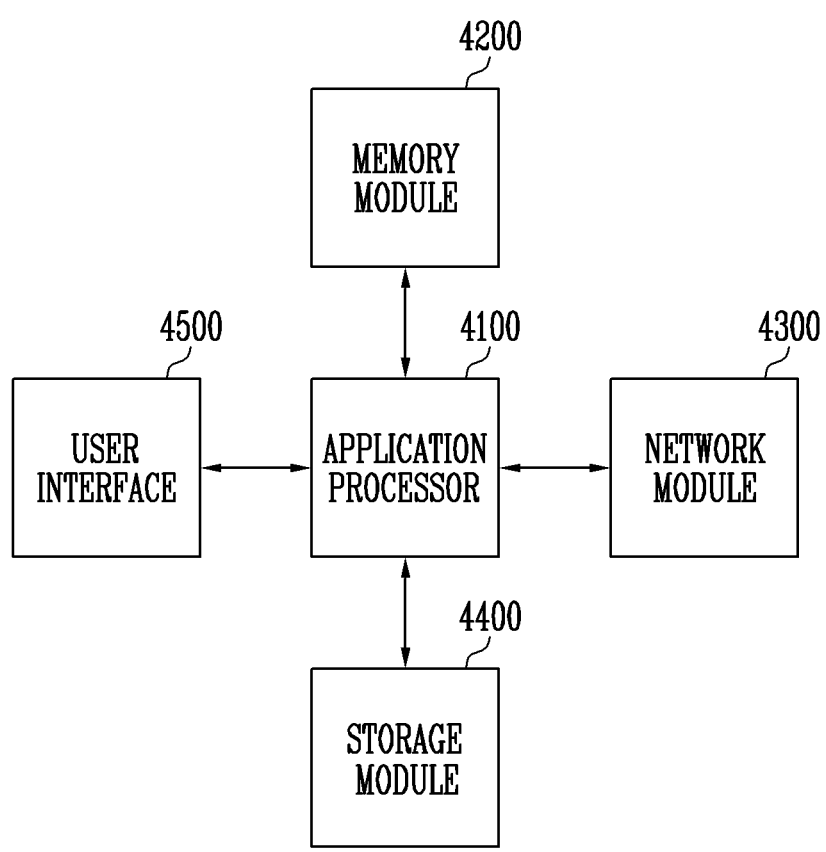
FIG. 22 is illustrates an embodiment of a user system.

FIG. 22 is a block diagram illustrating an embodiment of a user system 4000, to which a storage device as described herein may be applied.

Referring to FIG. 22, the user system 4000 includes an application processor 4100, a memory module 4200, a network module 4300, a storage module 4400, and a user interface 4500. The application processor 4100 may drive components in the user system 4000, an operating system (OS), a user program, or the like. For example, the application processor 4100 may include controllers for controlling components in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. The application processor 4100 and the memory module 4200 may, for example, be provided as one semiconductor package by being packaged based on a Package on Package (PoP).

The network module 4300 may communicate with external devices. For example, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. The network module 4300 may be in or coupled to the application processor 4100.

The storage module 4400 may store data, for example, received from the application processor 4100 and/or may transmit data stored therein to the application processor 4100. The storage module 4400 may be implemented, for example, with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. The storage module 4400 may be provided, for example, as a removable drive such as a memory card of the user system 4000 or an external drive.

The storage module 4400 may operate, for example, in a manner similar to the storage device 1000 of FIG. 1. The storage module 4400 may include a plurality of nonvolatile memory devices which may operate in a manner similar to memory device 100 described with reference to FIG. 1.

The user interface 4500 may include one or more interfaces for inputting data or commands to the application processor 4100 or for outputting data to an external device. The user interface 4500 may include one or more user input interfaces (e.g., a keyboard, a keypad, a button, a touch panel, a touch screen, a touch pad, a touch ball, a camera, a microphone, a gyroscope sensor, a vibration sensor and a piezoelectric element) and/or one or more output interfaces (e.g., a Liquid Crystal Display (LCD), an Organic Light Emitting Diode (OLED) display device, an Active Matrix OLED (AMOLED) display device, an LED, a speaker, and a monitor).

In accordance with one or more of the aforementioned embodiments, a memory controller is provided which is capable of improving performance of a read operation. In accordance with one or more additional embodiments, a storage device including such a memory controller is provided, along with a method of controlling the memory controller, which, for example, may achieve that improved performance.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

When implemented in at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. The embodiments may be combined to form additional embodiments.

What is claimed is:

1. A memory controller, comprising:
   a command storage including a first read command queue and a second read command queue, the first read command queue configured to store a read command and a physical address according to an index number, the read command to read data stored in a memory device and the physical address corresponding to the read command and including a plane number, a block number, and a page number;
   a command generation controller configured to provide an erase command to perform an erase operation including erasing data stored in one of a plurality of memory blocks of the memory device, provide a suspend command to suspend the erase operation in response to a request, provide a resume command to resume the erase operation after an operation corresponding to the request is completed, and output a scheduling event signal after the resume command is output; and
   a command schedule controller configured to, in response to the scheduling event signal:
      search for a first physical address group including physical addresses having a same page number among physical addresses stored in the first read command queue and a second physical address group including all physical addresses having a plane number different from the plane number of the first physical address group, among the physical addresses stored in the first read command queue,
      reorder an output sequence of the first read command queue by storing together the physical addresses of the first physical address group corresponding to the same page number at same index numbers of the second read command queue and storing respectively the physical addresses of the second physical address group at the index numbers of the second read command queue, and provide the read command to perform a read operation based on the second read command queue.

2. The memory controller of claim 1, wherein the first physical address group includes physical addresses having a same plane number, a same block number, and a same page number.

3. The memory controller of claim 2, wherein the command schedule controller is configured to schedule the first physical address group and a read command corresponding to the first physical address group, in any one index number among index numbers of the second read command queue.

4. The memory controller of claim 1, wherein the first physical address group includes physical addresses having different plane numbers and a same page number.

5. The memory controller of claim 4, wherein the command schedule controller is configured to schedule the first physical address group and read commands corresponding to the first physical address, in any one index number among the index numbers of the second read command queue.

6. The memory controller of claim 1, wherein, when the first physical address group is not searched, the command schedule controller is configured to:

search for a plane interleaving group including all physical addresses having different plane numbers, among the physical addresses stored in the first read command queue;

sequentially schedule physical addresses in the plane interleaving group in the consecutive index numbers of the second read command queue; and sequentially schedule a read command corresponding to each physical address in the plane interleaving group in the consecutive index numbers.

7. The memory controller of claim 6, wherein the command schedule controller is configured to:

sequentially schedule the physical addresses in the plane interleaving group, in index numbers from an index number corresponding to a first priority output sequence of the second read command queue; and sequentially schedule the read command corresponding to each physical address in the plane interleaving group, in the index numbers from the index number corresponding to the first priority output sequence of the second read command queue.

8. A memory controller, comprising:

a command storage including a first read command queue and a second read command queue, the first read command queue configured to store a read command and a physical address according to an index number, the read command to read data stored in a memory device and the physical address corresponding to the read command and including a plane number, a block number, and a page number;

a command generation controller configured to provide the memory device with a command to perform an erase operation including erasing data stored in one memory block among a plurality of memory blocks of the memory device, or to perform a write operation including storing data in one memory block among the plurality of memory blocks, and to output a scheduling event signal after a predetermined period elapses from a time at which the command is provided to the memory device; and a command schedule controller configured to, in response to the scheduling event signal:

search for a first physical address group including physical addresses having the same page number among physical addresses stored in the first read command queue and a second physical address group including all physical addresses having a plane number different from the plane number of the first physical address group, among the physical addresses stored in the first read command queue, reorder an output sequence of the first read command queue by storing together the physical addresses of the first physical address group corresponding to the same page number at same index numbers of the second read command queue and storing respectively the physical addresses of the second physical address group at the index numbers of the second read command queue, and provide the read command to perform a read operation based on the second read command queue.

9. The memory controller of claim 8, wherein the first physical address group includes physical addresses having a same plane number, a same block number and a same page number.

10. The memory controller of claim 9, wherein the command schedule controller is configured to schedule the first physical address group and a read command corresponding to the first physical address group, in any one index number among index numbers of the second read command queue.

11. The memory controller of claim 8, wherein the first physical address group includes physical addresses having different plane numbers and a same page number.

12. The memory controller of claim 11, wherein the command schedule controller is configured to schedule the first physical address group and read commands corresponding to the first physical address, in any one index number among the index numbers of the second read command queue.

13. The memory controller of claim 8, wherein, when the first physical address group is not searched, the command schedule controller is configured to:

search for a plane interleaving group including all physical addresses having different plane numbers among the physical addresses stored in the first read command queue;

sequentially schedule physical addresses in the plane interleaving group in the consecutive index numbers of the second read command queue; and sequentially schedule a read command corresponding to each physical address in the plane interleaving group in the consecutive index numbers.

14. The memory controller of claim 13, wherein the command schedule controller is configured to:

sequentially schedule the physical addresses in the plane interleaving group in index numbers from an index number corresponding to a first priority output sequence of the second read command queue; and sequentially schedule the read command corresponding to each physical address in the plane interleaving group in the index numbers from the index number corresponding to the first priority output sequence of the second read command queue.

15. A storage device, comprising:

a memory device including a plurality of planes; and a memory controller configured to, in response to a read request:

store a read command and a physical address in a first read command queue according to an index number, the read command to perform a read operation including reading data stored in the memory device, schedule read commands and physical addresses, which are stored in the first read command queue, in a second read command queue when a scheduling event occurs, and provide the memory device with read commands and physical addresses, which are stored in the second read command queue, according to a scheduled sequence, wherein the physical address includes a plane number, a block number, and a page number, and wherein the memory controller is configured to:

search for a first physical address group including physical addresses having a same page number among the physical addresses stored in the first read command queue and a second physical address group including all physical addresses having a plane number different from the plane number of the first physical address group, among the physical addresses stored in the first read command queue;

reorder an output sequence of the first read command queue by storing together the physical addresses of the first physical address group corresponding to the same page number at same index numbers of the second read command queue and storing respectively the physical addresses of the second physical address group at the index numbers of the second read command queue; and provide the read command to perform a read operation based on the second read command queue.

16. The storage device of claim 15, wherein:

the first physical address group includes physical addresses having a same plane number, a same block number and a same page number, and the memory controller is configured to schedule the first physical address group and a read command corresponding to the first physical address group, in one index number among index numbers of the second read command queue.

17. The storage device of claim 16, wherein, in response to the first physical address group and a read command corresponding to the first physical address group, the memory device is configured to:

perform a read operation on a page of a single plane having the physical addresses in the first physical address group, and provide the memory controller with data stored in the page of the single plane.

18. The storage device of claim 15, wherein:

the first physical address group includes physical addresses having different plane numbers and the same page number, and the memory controller is configured to schedule the first physical address group and read commands corresponding to the first physical address, in one index number among the index numbers of the second read command queue.

19. The storage device of claim 18, wherein, in response to the first physical address group and read commands corresponding to the first physical address group, the memory device is configured to:

simultaneously perform a read operation on pages of respective planes having the physical addresses in the first physical address group; and provide the memory controller with data stored in pages of the respective planes.

20. The storage device of claim 15, wherein the memory device is configured to:

perform a first read operation on a page of at least one plane having the physical addresses in the first physical address group, in response to the first physical address group and at least one read command corresponding to the first physical address group; and perform a second read operation on a page of at least one plane having the physical addresses in the second physical address group, in response to the second physical address group and at least one read command corresponding to the second physical address group, wherein the first read operation and the second read operation are configured to partially overlap with each other.

* * * * *